US011507436B2

(12) United States Patent
Van Benthem

(10) Patent No.: US 11,507,436 B2
(45) Date of Patent: Nov. 22, 2022

(54) PRIORITY BASED ARBITRATION

(71) Applicant: Imagination Technologies Limited, Kings Langley (GB)

(72) Inventor: Casper Van Benthem, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 56 days.

(21) Appl. No.: 17/207,652

(22) Filed: Mar. 20, 2021

(65) Prior Publication Data

US 2021/0349769 A1 Nov. 11, 2021

(30) Foreign Application Priority Data

Mar. 20, 2020 (GB) ..................................... 2004050

(51) Int. Cl.
*G06F 9/46* (2006.01)
*G06F 9/52* (2006.01)

(52) U.S. Cl.
CPC .................................... *G06F 9/526* (2013.01)

(58) Field of Classification Search
CPC ....................................................... G06F 9/526
See application file for complete search history.

(56) References Cited

U.S. PATENT DOCUMENTS 5,519,837 A 5/1996 Tran
6,978,329 B1 12/2005 Harral
7,062,582 B1 6/2006 Chowdhuri
2004/0210696 A1 10/2004 Meyer et al.
2012/0173781 A1 7/2012 Banerjee et al.
2013/0318270 A1 11/2013 Tune
2019/0121766 A1 4/2019 Shillingburg

FOREIGN PATENT DOCUMENTS

EP 3543862 A1 9/2019
GB 2527165 A 12/2015
GB 2567027 A 4/2019
GB 2568124 A 5/2019

OTHER PUBLICATIONS

Jou et al; "Model-Driven Design and Generation of New Multi-Facet Arbiters: From the Design Model to the Hardware Synthesis"; IEEE Transactions on Computer-Aided Design of Integrated Circuits and Systems; vol. 30; No. 8; Aug. 2011; pp. 1184-1196.

Savin et al; "Binary Tree Search Architecture for Efficient Implementation of Round Robin Arbiters"; Acoustics, Speech, and Signal Processing; vol. 5; 2004; pp. 333-336.

*Primary Examiner* — Gregory A Kessler
(74) *Attorney, Agent, or Firm* — Potomac Law Group, PLLC; Vincent M DeLuca

(57) ABSTRACT

Methods of arbitrating between requestors and a shared resource are described. The method comprises generating a vector with one bit per requestor, each initially set to one. Based on a plurality of select signals (one per decision node in a first layer of a binary decision tree, where each select signal is configured to be used by the corresponding decision node to select one of two child nodes), bits in the vector corresponding to non-selected requestors are set to zero. The method is repeated for each subsequent layer in the binary decision tree, based on the select signals for the decision nodes in those layers. The resulting vector is a one-hot vector (in which only a single bit has a value of one). Access to the shared resource is granted, for a current processing cycle, to the requestor corresponding to the bit having a value of one.

20 Claims, 16 Drawing Sheets

PRIORITY BASED ARBITRATION

BACKGROUND

Arbiters (and arbitration schemes) are used in computer systems where resources receive more requests at one time (e.g. in a cycle) than can be granted (e.g. processed) at the same time (e.g. in the particular cycle). This often occurs where multiple requesting entities (or requestors) share the same resource(s), where the shared resources may, for example, be memory or storage within the computer system or a computational resource. An arbiter uses a pre-defined set of rules or other criteria, referred to as an arbitration scheme, to decide which of the received requests are granted and which of the received requests are not granted (e.g. are delayed or refused).

A round robin arbiter may use a rotating priority scheme to ensure that, over a period of time, all requestors have some requests granted, i.e. that they are granted some access to the shared resource. However, this is complicated by the fact that not all requestors may submit a request in any cycle (e.g. clock cycle) and so it is not possible to strictly grant requests for each of the requestors in turn without impacting utilisation and efficiency. Furthermore, as the number of requestors increases, delay resulting from the arbitration scheme and time taken to determine which requests are granted in any clock cycle may also increase and this may reduce the throughput and efficiency of the arbitration scheme. Alternatively, to mitigate these effects, the overall size of the hardware may be increased.

The embodiments described below are provided by way of example only and are not limiting of implementations which solve any or all of the disadvantages of known arbiters and arbitration schemes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods of arbitrating between requestors and a shared resource are described. The method comprises generating a vector with one bit per requestor, each initially set to one. Based on a plurality of select signals (one per decision node in a first layer of a binary decision tree, where each select signal is configured to be used by the corresponding decision node to select one of two child nodes), bits in the vector corresponding to non-selected requestors are set to zero. The method is repeated for each subsequent layer in the binary decision tree, based on the select signals for the decision nodes in those layers. The resulting vector is a one-hot vector (in which only a single bit has a value of one). Access to the shared resource is granted, for a current processing cycle, to the requestor corresponding to the bit having a value of one.

A first aspect provides a method of arbitrating between a plurality of ordered requestors and a shared resource in a computing system, the method comprising: generating a vector comprising one bit corresponding to each requestor and setting each bit in the vector to one; based on a plurality of select signals, each select signal corresponding to a different decision node in a first layer of a binary decision tree implemented in hardware logic, setting bits in the vector corresponding to non-selected requestors to zero, wherein each select signal is configured to be used by the corresponding decision node in the binary decision tree to select one of two child nodes; and for each subsequent layer in the binary decision tree and based on one or more select signals corresponding to different decision nodes in the subsequent layer of the binary decision tree, setting bits in the vector corresponding to non-selected requestors to zero, wherein the resulting vector is a one-hot vector comprising a plurality of bits having a value of zero and a single bit having a value of one and wherein the method further comprises: granting access to the shared resource to the requestor corresponding to the bit having a value of one, wherein access is granted for a current processing cycle.

A second aspect provides an arbiter configured to arbitrate between a plurality of ordered requestors and a shared resource in a computing system, the arbiter comprising requestor selection logic and the requestor selection logic comprising: a binary decision tree implemented in hardware logic and comprising a plurality of input nodes and a plurality of decision nodes, each input node corresponding to one of the requestors; and hardware logic arranged to generate a vector comprising one bit corresponding to each requestor and set each bit in the vector to one; wherein each decision node in the binary decision tree is arranged, based on a select signal, to select one of two child nodes and based on the selection to update one or more bit in the vector such that bits in the vector corresponding to non-selected requestors are zero, the resulting vector, after update by all the decision nodes in the binary decision tree, is a one-hot vector comprising a plurality of bits having a value of zero and a single bit having a value of one and the arbiter is further arranged to grant access to the shared resource to the requestor corresponding to the bit having a value of one, wherein access is granted for a current processing cycle.

The arbiter may further comprise select signal generation logic arranged to generate a select signal.

The arbiter may further comprise an input arranged to receive a plurality of valid bits for each processing cycle, each valid bit corresponding to one of the plurality of requestors and indicating whether, in the processing cycle, the requestor is requesting access to the shared resource; and wherein the select signal generation logic comprises: an input arranged to receive a plurality of priority bits for each processing cycle, each priority bit corresponding to one of the plurality of requestors and indicating whether, in the processing cycle, the requestor has priority; hardware logic comprising a plurality of AND logic elements and arranged to generate a plurality of valid_and_priority bits for each processing cycle, each valid_and_priority bit corresponding to one of the plurality of requestors, by combining, for each of the requestors, the corresponding valid bit and priority bits in one of the AND logic elements; a first OR-reduction tree arranged, in each processing cycle, to perform pair-wise OR-reduction on the valid bits and to generate, at each level of the OR-reduction tree, one or more additional valid bits, each corresponding to a different non-overlapping set of requestors; a second OR-reduction tree arranged, in each processing cycle, to perform pair-wise OR-reduction on the valid_and_priority bits and to generate, at each level of the OR-reduction tree, one or more additional valid_and_priority bits, each corresponding to a different non-overlapping set of the requestors; and hardware logic arranged, for each processing cycle and each decision node, to: determine a value of the valid_and_priority bit for a set of requestors comprising all the requestors connected to a left child node of the decision node; determine a value of the valid_and_priority bit for a set of requestors comprising all the requestors connected to a right child node of the decision node; in response to determining that the value of the valid_and_priority bit for the set of requestors comprising all the requestors connected to the right child node of the decision node is equal to one, set a select signal for the node equal to zero; in response to determining that the value of the valid_and_priority bit for the set of requestors comprising all the requestors connected to the left child node of the decision node is equal to one and the value of the valid_and_priority bit for the set of requestors comprising all the requestors connected to the right child node of the decision node is equal to zero, set the select signal for the node equal to one; and in response to determining that both the value of the valid_and_priority bit for the set of requestors comprising all the requestors connected to the left child node of the decision node and the value of the valid_and_priority bit for the set of requestors comprising all the requestors connected to the right child node of the decision node are equal to zero, determine a value of the valid bit for a set of requestors comprising all the requestors connected to the right child node of the decision node and set the select signal for the node equal to an inverse of the valid bit.

A third aspect provides an arbiter configured to perform a method as described herein.

The arbiter may be embodied in hardware on an integrated circuit. There may be provided a method of manufacturing, at an integrated circuit manufacturing system, an arbiter. There may be provided an integrated circuit definition dataset that, when processed in an integrated circuit manufacturing system, configures the system to manufacture an arbiter. There may be provided a non-transitory computer readable storage medium having stored thereon a computer readable description of an integrated circuit that, when processed, causes a layout processing system to generate a circuit layout description used in an integrated circuit manufacturing system to manufacture an arbiter.

There may be provided an integrated circuit manufacturing system comprising: a non-transitory computer readable storage medium having stored thereon a computer readable integrated circuit description that describes the arbiter; a layout processing system configured to process the integrated circuit description so as to generate a circuit layout description of an integrated circuit embodying the arbiter; and an integrated circuit generation system configured to manufacture the arbiter according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
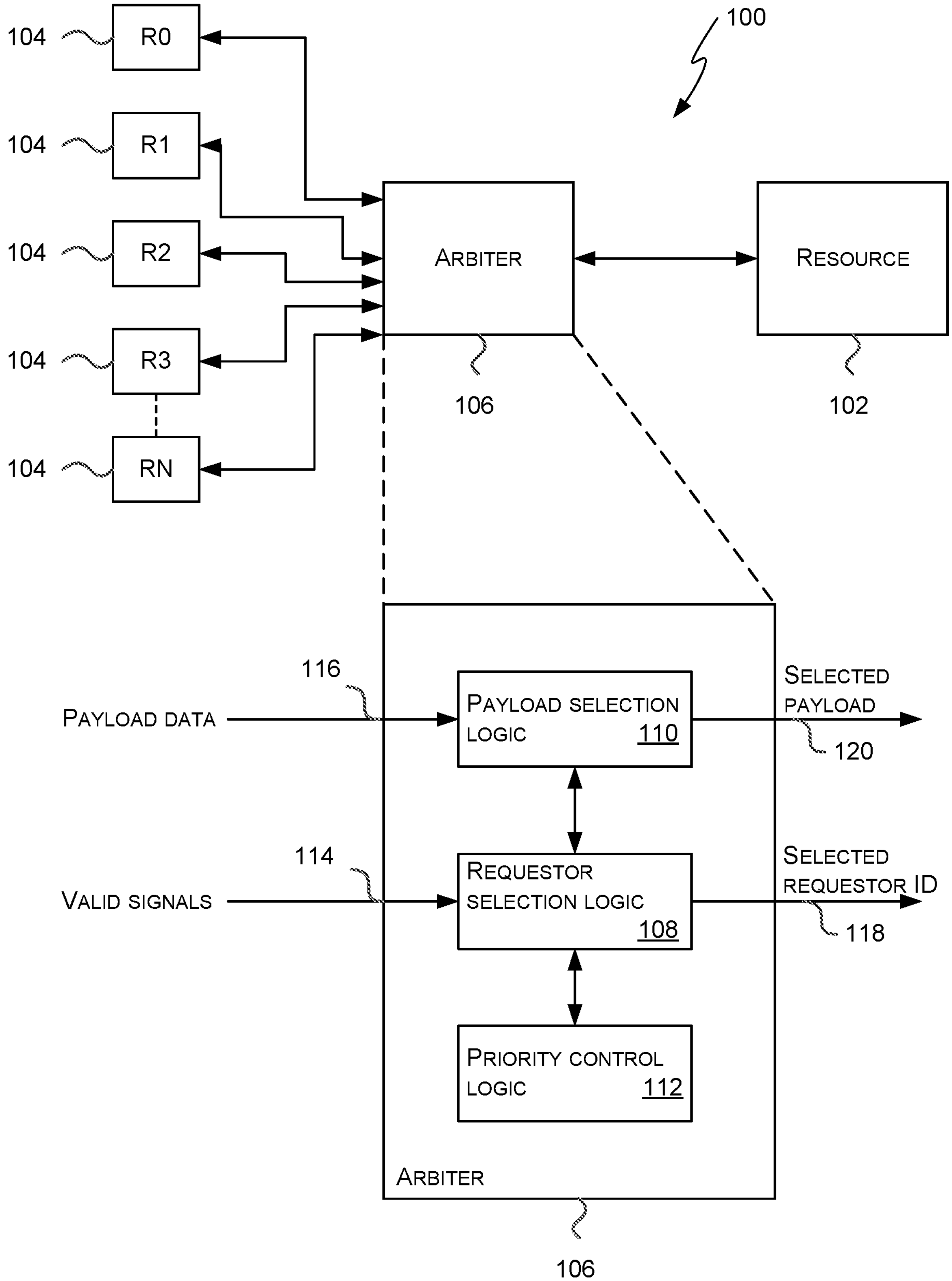
FIG. 1 is a schematic diagram of a computer system comprising a resource that is shared between a plurality of requestors.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Described herein are a number of different techniques for improving the performance of an arbiter that implements a priority-based arbitration scheme, such as a round robin arbiter. The improvement in performance may be in terms of a reduction in the compile and/or synthesis time of the arbiter and/or a reduction in the time taken to select a particular request (i.e. to perform the arbitration within the arbiter). Additionally the physical size of the arbiter (e.g. in terms of hardware area) may be reduced compared to alternative methods. The techniques described herein may be used for any number of requestors, including in computing systems with large numbers of requestors (e.g. hundreds of requestors or more than 1000 requestors). These different techniques may be used independently of each other or in any combination and whilst they are described below with reference to a particular round robin arbitration scheme, they may be used in combination with other priority-based arbitration schemes (e.g. where another prioritization scheme is used, such as giving certain requestors priority over others at all times when they are active, or where a tracking mechanism is used that increases the priority of a requestor in some situations and/or reduces the priority of a requestor in other situations, such as when there is no hurry to obtain access to the resource, or where the prioritization is controlled by any other module in the computer system).

In a round robin arbiter, the requestors are ordered (e.g. left to right, right to left, top to bottom, etc.) from lowest to highest according to one or more criteria and in any cycle some or all of the requestors may request access to a shared resource. Those requestors that request access in a given cycle may be referred to as 'active' for that cycle. In any given cycle, the arbiter may select the lowest ordered active requestor with priority or, if there are no active requestors that have priority, the lowest ordered active requestor. As described above, a round robin arbiter uses a rotating priority scheme and so for the next cycle (e.g. for cycle T+1), all higher ordered requestors than the previously selected requestor (i.e. the requestor selected in cycle T) are given priority and the remainder of the requestors (i.e. the requestor selected in cycle T and all lower ordered requestors) are not given priority. For the purposes of the following description, requestors are ordered from right to left.

Whilst the requestors are labelled as 'priority' or 'no priority' in the description above, it will be appreciated that in other examples the terms 'high priority' and 'low priority' may alternatively be used. Furthermore, in other examples the arbitration scheme may implement the opposite of that described above, i.e. such that in any given cycle (e.g. cycle T) the arbiter selects the highest ordered active requestor with priority, or the highest ordered active requestor where no active requestors have priority, and then in the next cycle (e.g. cycle T+1), all lower ordered requestors than the previously selected requestor (i.e. from cycle T) are given priority and the remainder of the requestors (i.e. the requestor selected in cycle T and all higher ordered requestors) are not given priority. It will also be appreciated that whilst the examples described below show one particular ordering of the requestors, in other examples, the requestors may be reordered in any way (e.g. whilst maintaining a particular priority-based arbitration scheme, such as a round robin scheme).

The term 'cycle' is used herein to mean a processing cycle of the resource. The processing cycle of the resource may, in various examples, be a clock cycle but in other examples cycles could be defined in other ways.

FIG. 1 is a schematic diagram of a computer system 100 comprising a resource 102 that is shared between a plurality of requestors 104 (labelled R0-RN, where N is an integer). The shared resource 102 may, for example, be a memory or other storage element, a networking switch fabric, a computational resource, etc. Access to the shared resource is controlled by the arbiter 106 that is in communication with both the shared resource 102 and each of the requestors 104. Whilst FIG. 1 only shows a single resource 102, there may be more than one shared resource and in such examples, there may be multiple arbiters (e.g. one arbiter for each shared resource) or an arbiter may control access to more than one resource.

In any cycle, none, one or more of the requestors 104 may request access to the resource 102 and this request may be submitted in any way (e.g. by pulling a 'valid' signal high). There may be a payload associated with each request, where this payload may, for example, be data (e.g. a memory address that is to be read), an ID of the requestor (e.g. where the requestor is processing multiple threads and hence its ID does not necessary follow from its index) or an instruction and the payloads may be provided to the arbiter 106 by those requestors that are requesting access to the resource in a particular cycle. The arbiter 106 uses a priority-based arbitration scheme to determine (i.e. select) which one of the requestors 104 that are requesting access to the resource 102 in a particular cycle is granted access in that cycle and then passes the payload for the selected requestor to the shared resource 102. An identifier for the selected requestor, or any form of information that identifies the selected requestor, may be passed to the resource 102 in addition to the payload from the selected requestor.

As shown in FIG. 1, the arbiter 106 may comprise requestor selection logic 108, payload selection logic 110 and priority control logic 112, along with inputs 114 to receive the valid signals from the requestors 104, inputs 116 to receive the payload data from the requestors 104 and one or more outputs 118, 120. Whilst the requestor selection logic 108 and payload selection logic 110 are shown as separate blocks in FIG. 1, in various examples these two functional blocks may be partially or fully combined.

The requestor selection logic 108 receives as inputs the valid signals from the requestors 104 (via inputs 114) and priority data from the priority control logic 112 and outputs data identifying a selected requestor. Data identifying a selected resource may be output to the payload selection logic 110 and/or the resource 102 (via output 118) and where data is output to both the payload selection logic 110 and the resource 102, the data that is output to each may be the same or may be in a different form. For example, the data output to the payload selection logic 110 may be in the form of a one-hot signal that comprises one bit corresponding to each of the requestors (e.g. N+1 bits in the example of FIG. 1) and where the bit corresponding to the selected requestor is set to a one and all the other bits are set to a zero, and the data output to the resource 102 may be an index for the selected resource or a one-hot identifier. In addition to, or instead of, sending data identifying the selected requestor to the resource 102, the selected requestor is also notified by the arbiter 106 (e.g. by the requestor selection logic 108), e.g. in the form of an enable signal. As described below, a one-hot signal generated by the arbiter 106 may provide the enable signal(s) for the requestors (e.g. such that non-selected requestors receive a signal that is a zero and only the selected requestor receives a signal that is a one). The requestor selection logic 108 may comprise a binary decision tree as described in more detail below.

The payload selection logic 110 receives as inputs the payload data from the requestors 104 (via inputs 116) and may also receive one or more of: the valid signals from the requestors, priority data from the priority control logic 112 and data identifying the selected requestor. The payload selection logic 110 may comprise a binary decision tree or may comprise other hardware logic, as described in more detail below.

The priority control logic 112 generates the priority data used by the requestor selection logic 108 and optionally by the payload selection logic 110 and updates that data each cycle dependent upon which requestor is selected by the requestor selection logic 108 (e.g. as described above). It will be appreciated that the operation of updating the priority data may not necessarily result in a change to the priority data in each cycle and this will depend upon the particular update rules used by the priority control logic 112. These update rules form part of the arbitration scheme used by the arbiter 106 and are pre-defined.

Figure 2:
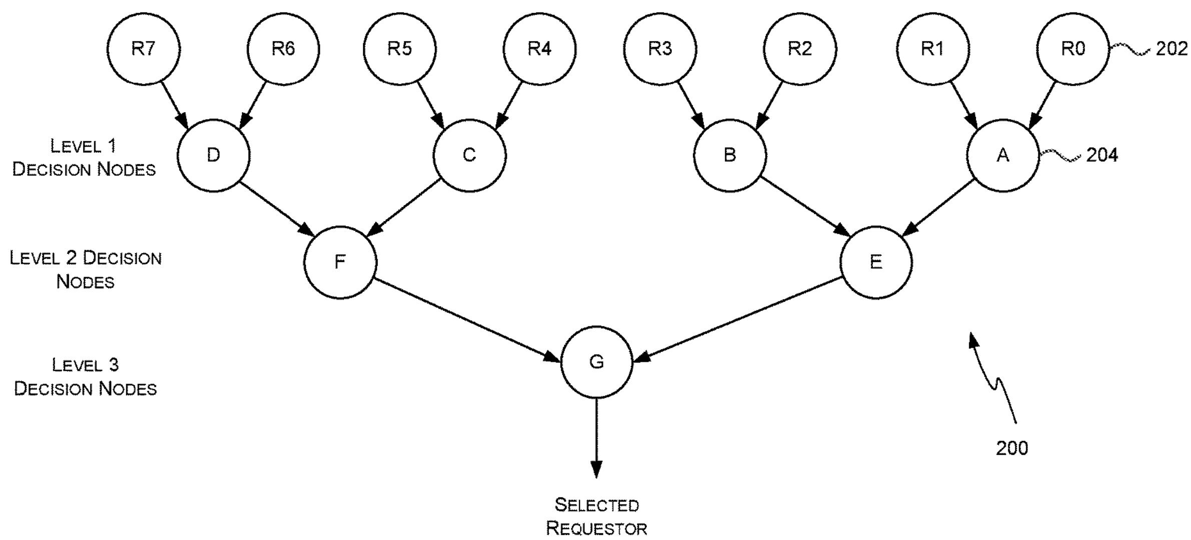
FIG. 2 is a schematic diagram showing an example of a binary decision tree.

FIG. 2 is a schematic diagram showing an example of a binary decision tree 200, such as may be implemented in hardware logic within the requestor selection logic 108 and/or payload selection logic 110. A binary decision tree 200 is a structure that can be configured to select one element (e.g. one requestor) from a plurality of elements (e.g. a plurality of requestors, RO-RN, where in the example of FIG. 2, N=7) by comparing pairs of elements. The input nodes 202 of the binary decision tree 200, which may be referred to as leaf nodes, each correspond to one of the plurality of elements (e.g. requestors) and are populated with data relating to the corresponding element (e.g. data relating to the corresponding requestor). Each leaf node 202 is connected to a decision node in a first layer of decision node, with each decision node in the first layer being connected to two leaf nodes. A decision tree comprises one or more layers of decision nodes 204 and this is dependent upon the number of elements and hence leaf nodes. For a binary decision tree relating to N+1 elements, such that there are N+1 leaf nodes, there may, for example, be $\lfloor \log_2(N+1) \rceil$ layers of decision nodes. Each decision node 204 is connected to two nodes in the previous layer and these may be referred to as the 'child nodes' of that particular decision node.

As described above, where the binary decision tree 200 is used to select a requestor from a plurality of requestors, each leaf node is populated with data relating to its corresponding requestor (where, as described below, this data may or may not include the payload data) and each decision node selects one of its two child nodes according to predefined criteria and is populated with the data of the selected child node. In this way, data corresponding to the selected requestors at each node propagate through the decision tree until the final layer—level 3 in the example of FIG. 2—in which the single decision node is populated with the data corresponding to a single one of the plurality of requestors and this is the requestor that is granted access to the resource.

Figure 3:
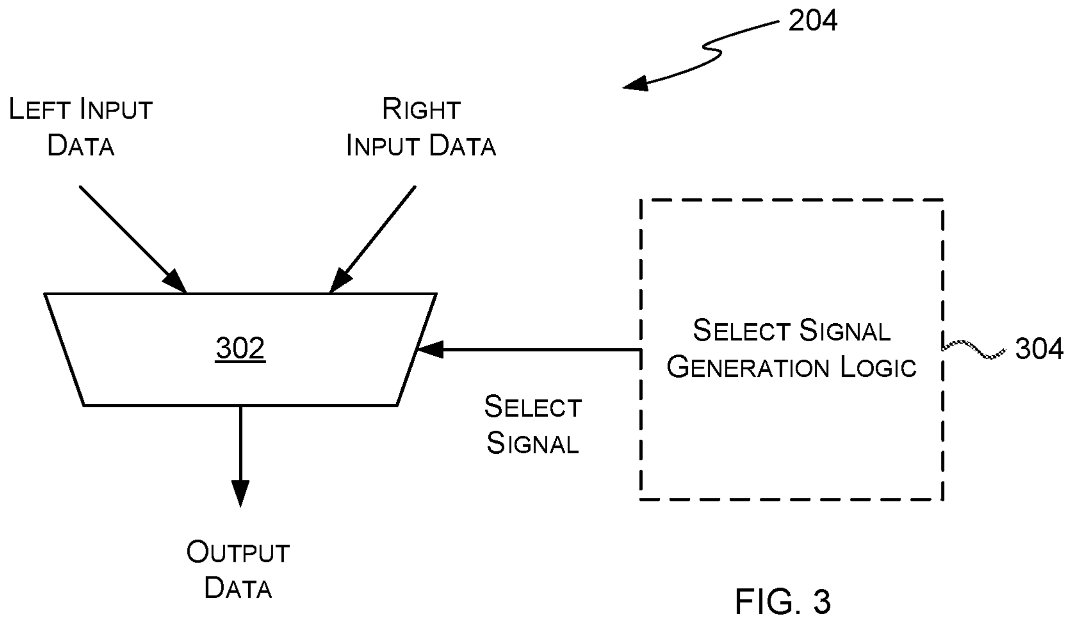
FIG. 3 is a schematic diagram showing an example decision node.

FIG. 3 is a schematic diagram showing an example decision node 204. The decision node 204 comprises a multiplexer 302 that selects the data from one of the child nodes, referred to in FIG. 3 as the left node and right node, based on a select signal that may be generated within the node (e.g. in the select signal generation logic 304) or may be provided to the node. In examples where the select signal is a single bit, it may be referred to as a left select signal because if the select signal is a one, the left child node data is selected by the mux 302 and if the select signal is a zero, the right child node data is selected by the mux 302. It will be appreciated that in other implementations the select signal may alternatively be a right select signal or may comprise more than one bit. Furthermore, instead of referring to left and right nodes, the nodes may be referred to by their relative position in the ordering of nodes, for example, where the left node is lower in the ordering it may be referred to as the 'low node' and where the right node is higher in the ordering it may be referred to as the 'high node'.

The information that is held at each node (and hence propagates through the decision tree) may, for example, comprise an identifier for the requestor (e.g. a requestor ID), information indicating whether the requestor has requested access to the resource in the current cycle (e.g. the valid signal for the requestor for the current cycle, which may be a single bit) and information indicating whether the requestor has priority in the current cycle (e.g. a priority bit for the requestor for the current cycle). In various examples, where the payload selection logic 110 and requestor selection logic 108 are combined, this information may also include the payload data for the requestor.

In some arbiters, the information that is held at each node may comprise a one-hot signal (or mask) and the payload selection logic 110 may comprise hardware logic that selects one of the payload inputs according to the one-hot signal output from the decision tree 200. A one-hot signal is a string of bits (e.g. a vector) in which no more than one bit is a one (and the remaining bits are all zeros). Where a one-hot signal is held at each node, the signal comprises N+1 bits and identifies the requestor according to the position of the one in the signal, i.e. the one-hot signal for the $i^{th}$ requestor comprises a one in the $i^{th}$ bit position (with the $1^{st}$ bit, i=1, being the right-most bit, in the examples described herein). Referring to the example in FIG. 2, for requestor R0 (the first requestor), the one-hot signal is 00000001, for requestor R3 (the fourth requestor), the one-hot signal is 00001000 and for requestor R7 (the last requestor), the one hot signal is 10000000.

Figure 4:
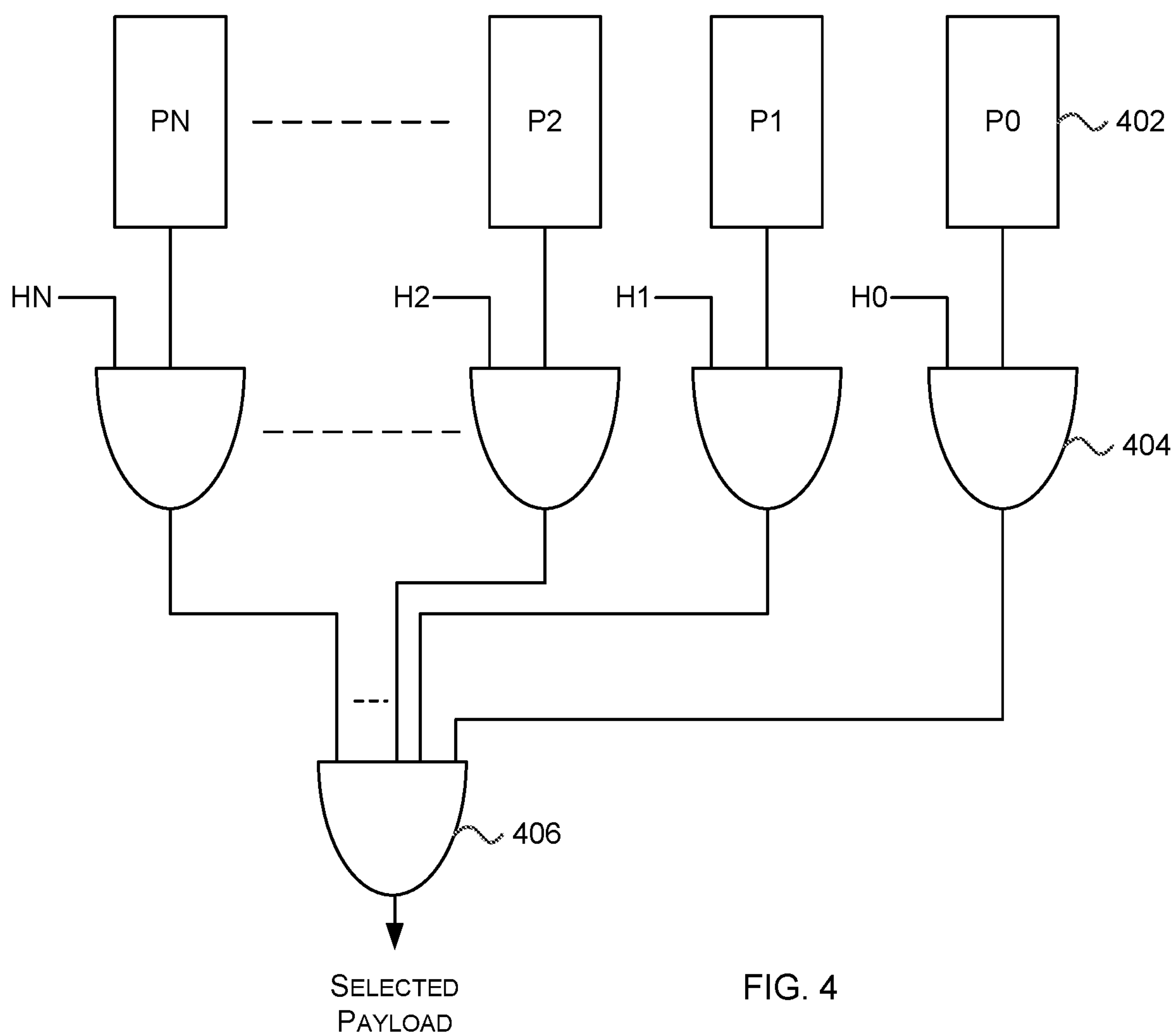
FIG. 4 shows a schematic diagram of example payload selection logic.

FIG. 4 shows a schematic diagram of example payload selection logic 110 that uses the one-hot signal output from a decision tree 200 within the requestor selection logic 108. As shown in FIG. 4, the payload selection logic 110 receives as input the payload data 402 from each active requestor (labelled P0-PN) along with the N+1 bits of the one-hot signal (labelled H0-HN) output from the requestor selection logic 108 and comprises a series of AND logic elements 404 (that each implement an AND logic function) and an OR-reduction stage 406. The AND logic elements 404 output the payload data in the event that the one-hot signal bit Hi (where i=0, . . . , N) is a one and output a series of zeros in the event that the one-hot signal bit Hi is a zero. Alternatively the payload selection logic 110 may be implemented using one or more multiplexers that select payload data according to bits from the one-hot signal output by the requestor selection logic 108.

In a first arbiter optimization technique described herein, instead of storing a one-hot signal (or mask) at each node in the binary decision tree 200 within the requestor selection logic 108 (where this one-hot signal at each node may have a large bit width) and propagating the one-hot signals through the decision tree (e.g. by selecting, using a multiplexer at each node, one of the one-hot signals corresponding to child nodes), a common vector of bits may be stored for each layer in the decision tree and updated based on the select signals in the decision nodes in the particular layer. The common vector is not a one-hot signal initially, but instead comprises all ones and at each layer in the decision tree the select signals are used to selectively replace half the remaining ones in the vector with zeros, with the vector remaining the same width (i.e. comprising the same number of bits) throughout every stage of the tree. The select signal from the final decision node in the last layer of decision nodes in the decision tree reduces the number of ones from two to one and hence the common vector becomes a one-hot vector. In this way, the one-hot signal output by the requestor selection logic 108 and used by the payload selection logic 110, is generated separately from, but in parallel with, the decision tree 200. This may significantly reduce the compile and/or synthesis time of the arbiter, particularly where there are large numbers of requestors (e.g. 1024 requestors or more). Furthermore, the resulting hardware may be smaller in size (e.g. in area) than where the one-hot signal propagates through the decision tree. This technique may be referred to as 'elimination-based one-hot generation' because of the removal of ones from the vector at each level in the decision tree.

Figure 5A:
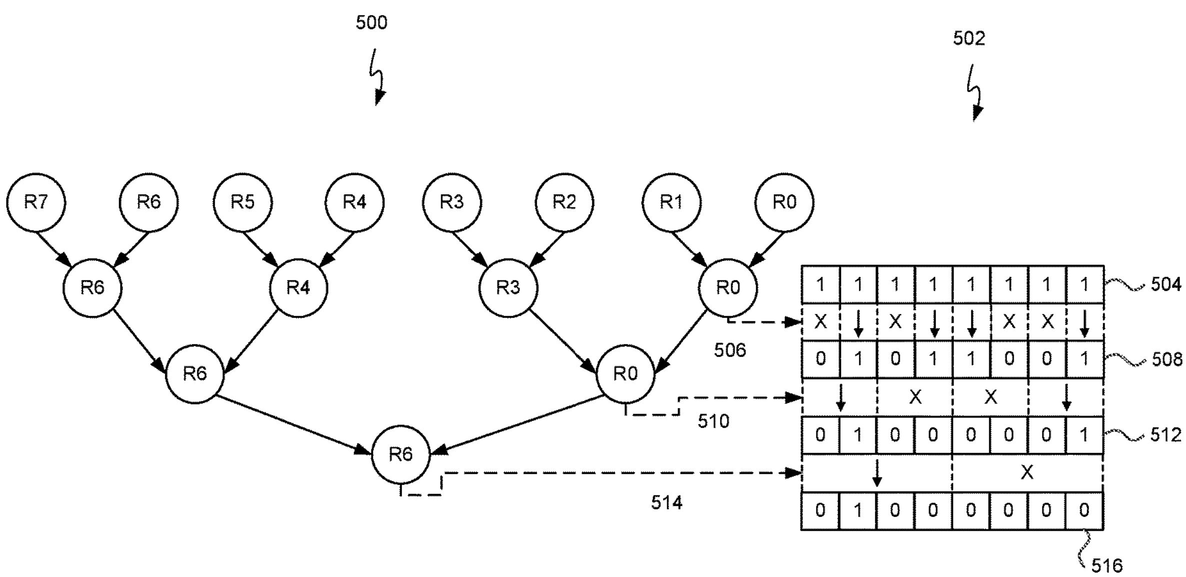
FIG. 5A is a schematic diagram showing an example method of generating a one-hot signal.

The generation of the one-hot signal is shown graphically in FIG. 5A. FIG. 5A shows an example binary decision tree 500 on the left, with each decision node labelled with the requestor that is selected by that node, and the gradual, layer-by-layer, formation of the one-hot signal on the right (as indicated by arrow 502). According to this first optimization technique, the common vector 504 initially comprises N+1 bits (where there are N+1 requestors identified RO-RN, as detailed above) and all bits are set to one. In the first layer of decision nodes, the select signals 506 are used to select requestors R0, R3, R4 and R6 and the corresponding bits in the common vector are left unchanged (as indicated by the downwards arrows on the right of FIG. 5A), whilst the other bits in the common vector are set to zero (as indicated by the Xs on the right of FIG. 5A), to generate an updated vector 508 comprising (N+1)/2 zeros (e.g. 4 zeros, where N=7). In the next layer of decision nodes, the select signals 510 are used to select requestors R0 and R6 and the two corresponding groups of bits in the common vector (where a group of bits corresponds to a selected branch of the decision tree and comprises one bit for each requestor in the selected branch, i.e. two bits for the second layer of decision nodes) are left unchanged (as indicated by the downwards arrows on the right of FIG. 5A). The other bits in the common vector (some of which are already zero), which correspond to non-selected requestors, and hence non-selected branches of the decision tree, are set to zero (as indicated by the Xs on the right of FIG. 5A), to generate an updated vector 512 comprising (N+1)/4 zeros (e.g. 2 zeros, where N=7). In the decision tree of FIG. 5A, there is only one further layer of decision nodes and in this final layer, the select signal 514 is used to select requestor R6 and the corresponding group of bits in the common vector, where each group of bits now comprises four bits (one for each requestor in the selected branch), are left unchanged (as indicated by the downwards arrows on the right of FIG. 5A), whilst the other bits in the common vector (some of which are already zero and which correspond to the non-selected branches in the decision tree) are set to zero (as indicated by the Xs on the right of FIG. 5A), to generate an updated vector 516 comprising (N+1)/8 zeros (e.g. a single zero, where N=7). As there are no further layers of decision nodes in the tree, the updated vector 516 is output as the one-hot signal.

Figure 5B:
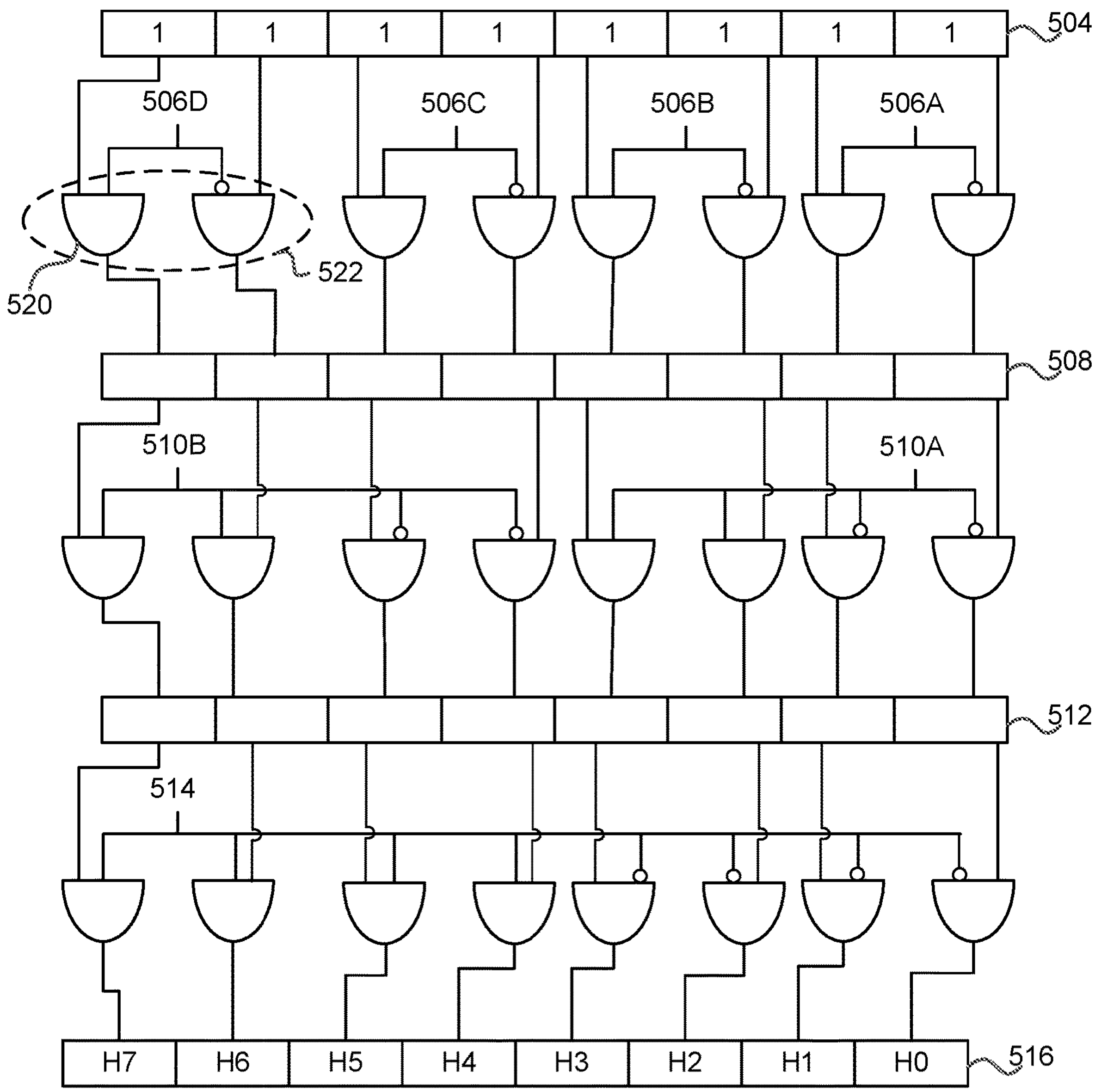
FIG. 5B is a schematic diagram of an example hardware implementation which may be used to update the common vector based on the select signals.

FIG. 5B is a schematic diagram of an example hardware implementation which may be used to update the common vector based on the select signals, which in this example are select left signals. As shown in FIG. 5B, the hardware arrangement comprises, at each level, one AND logic element 520 per requestor (i.e. N+1 AND logic elements per level). The first level of decision nodes in the decision tree 500 comprises four decision nodes and hence there are four select signals 506A-D (denoted select below, where in the example shown signals 506A and 506C are a zero and signals 506B and 506D are a one) and each select signal relates to the selection, or non-selection, of a branch comprising only a single leaf node and hence only a single requestor. As a result, the AND logic elements 520 are logically grouped in pairs 522 with the first AND logic element in a pair updating the bit, $H_{left}$, in the common vector corresponding to the left input node of the decision node each pair and implementing the following logic (where $H_{left}'$ is the updated bit in the common vector):

$$H_{left}'=H_{left}\wedge \text{select}$$

The second AND logic element in the pair updates the bit, $H_{right}$, in the common vector corresponding to the right input node of the decision node each pair and implementing the following logic (where $H_{right}'$ is the updated bit in the common vector):

$$H_{right}'=H_{right}\wedge \overline{\text{select}}$$

The second level of decision nodes in the decision tree comprises two decision nodes and hence there are two select signals 510A-B and each select signal relates to the selection, or non-selection, of a branch comprising two leaf nodes (and hence two requestors). As a result, the AND logic elements 520 are logically grouped in fours and within each group of four, the two bits in the common vector corresponding to the left branch that is input to a decision node in the second level are updated in the same way, i.e.:

$$H_{left}'=H_{left}\wedge \text{select}$$

Similarly, the two bits in the common vector corresponding to the right branch that is input to a decision node in this second level are updated in the same way, i.e.:

$$H_{right}'=H_{right}\wedge \overline{\text{select}}$$

In the example shown, signal 510A is a zero and signal 510B is a one.

In the third level of decision nodes, which is the final level in the example of FIG. 5A, the decision tree comprises a single node and hence there is only one select signal 514 (which is a one). The select signal relates to the selection, or non-selection, of a branch comprising four leaf nodes (and hence four requestors). As a result, the four bits of the common vector corresponding to the left branch that is input to the decision node are updated in the same way, i.e.:

$$H_{left}'=H_{left}\wedge \text{select}$$

Similarly, the four bits in the common vector corresponding to the right branch that is input to the decision node in this third level are updated in the same way, i.e.:

$$H_{right}'=H_{right}\wedge \overline{\text{select}}$$

It will be appreciated that FIG. 5B shows just one example hardware implementation which may be used to update the common vector based on the select signals, which in this example are select left signals. In another example, which is a variation on that shown in FIG. 5B, a multiplexer may be used in the lower levels to provide a more compact representation (e.g. the signals may be grouped and multiplexed).

Figure 6:
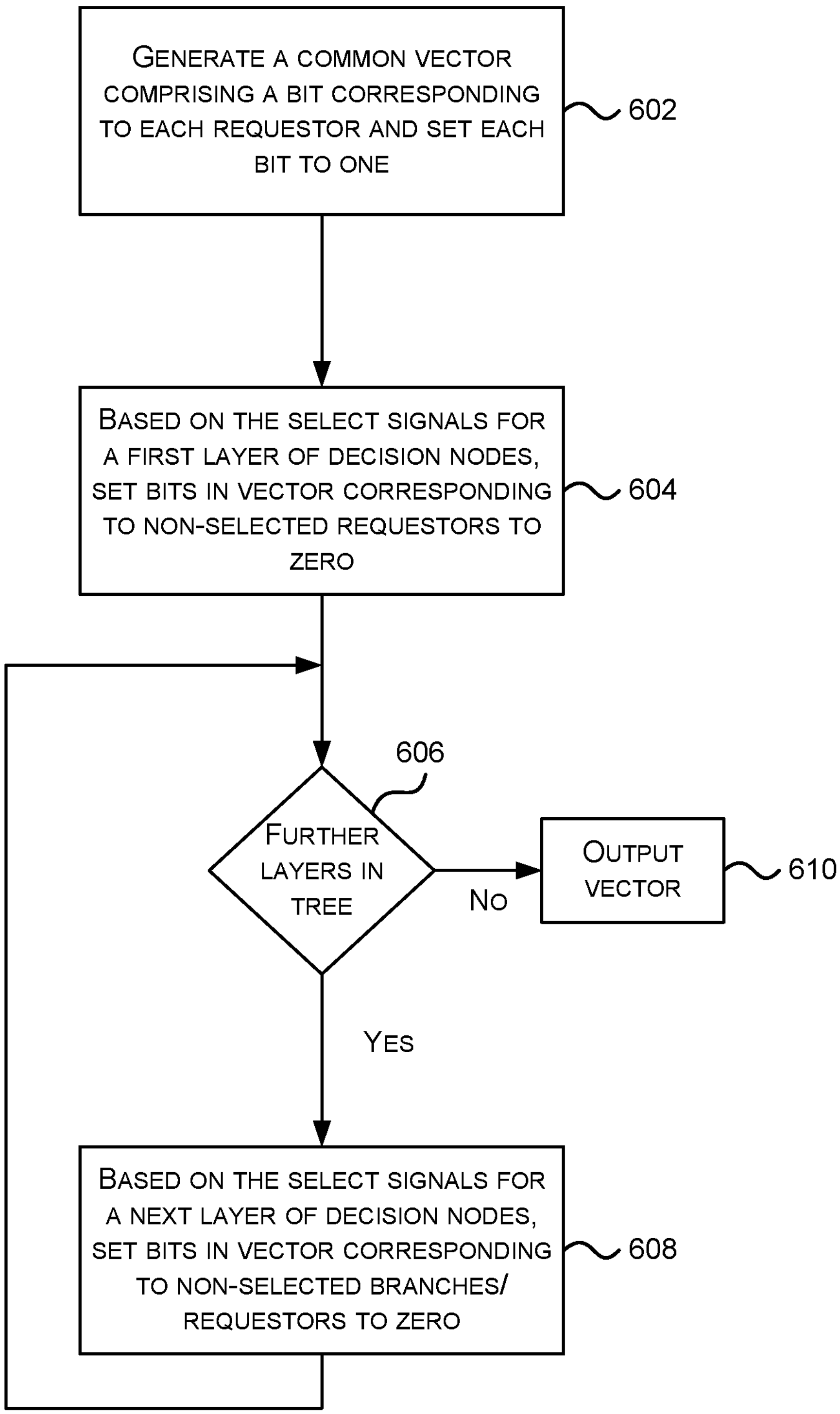
FIG. 6 shows a flow diagram of an example method of generating a one-hot signal in an arbiter.

FIG. 6 shows a flow diagram of an example method of generating a one-hot signal in an arbiter, where the one-hot signal may subsequently be used by payload selection logic 110 within the arbiter (e.g. as described above with reference to FIG. 4). In addition, or instead, the one-hot signal that is generated in one cycle (e.g. cycle T) may be used to generate the priority data for the next cycle (e.g. cycle T+1), as described below with reference to FIG. 9. Additionally, the one-hot signal may be used to provide enable signals that are communicated back to the requestors in order to notify the selected requestor that it has been selected (i.e. served).

As shown in FIG. 6, the method comprises generating a common vector comprising the same number of bits as there are requestors (e.g. N+1 bits for the example shown in FIG. 1) and setting each bit in the common vector to one (block 602). Then, based on the select signals for the first layer of decision nodes, bits corresponding to the non-selected requestors are changed from a one to a zero (block 604). If there is more than one layer of decision nodes ('Yes' in block 606), the common vector is then updated based on the select signals for the second layer of decision nodes and the bits in the common vector that correspond to the non-selected branches of the decision tree (and hence the non-selected requestors) are set to zero (block 608). The method is repeated for each subsequent layer of decision nodes ('Yes' in block 606 followed by block 608) until the common vector has been updated based on the select signals for every layer of decision nodes in the decision tree ('No' in block 606) and at that point the common vector, which now only comprises a single bit that is a one, is output (block 610).

As described above, the one-hot vector that is generated by the method of FIG. 6, may then be input to payload selection logic 110, such as shown in FIG. 4 and used to select the payload for the selected requestor.

Figure 7:
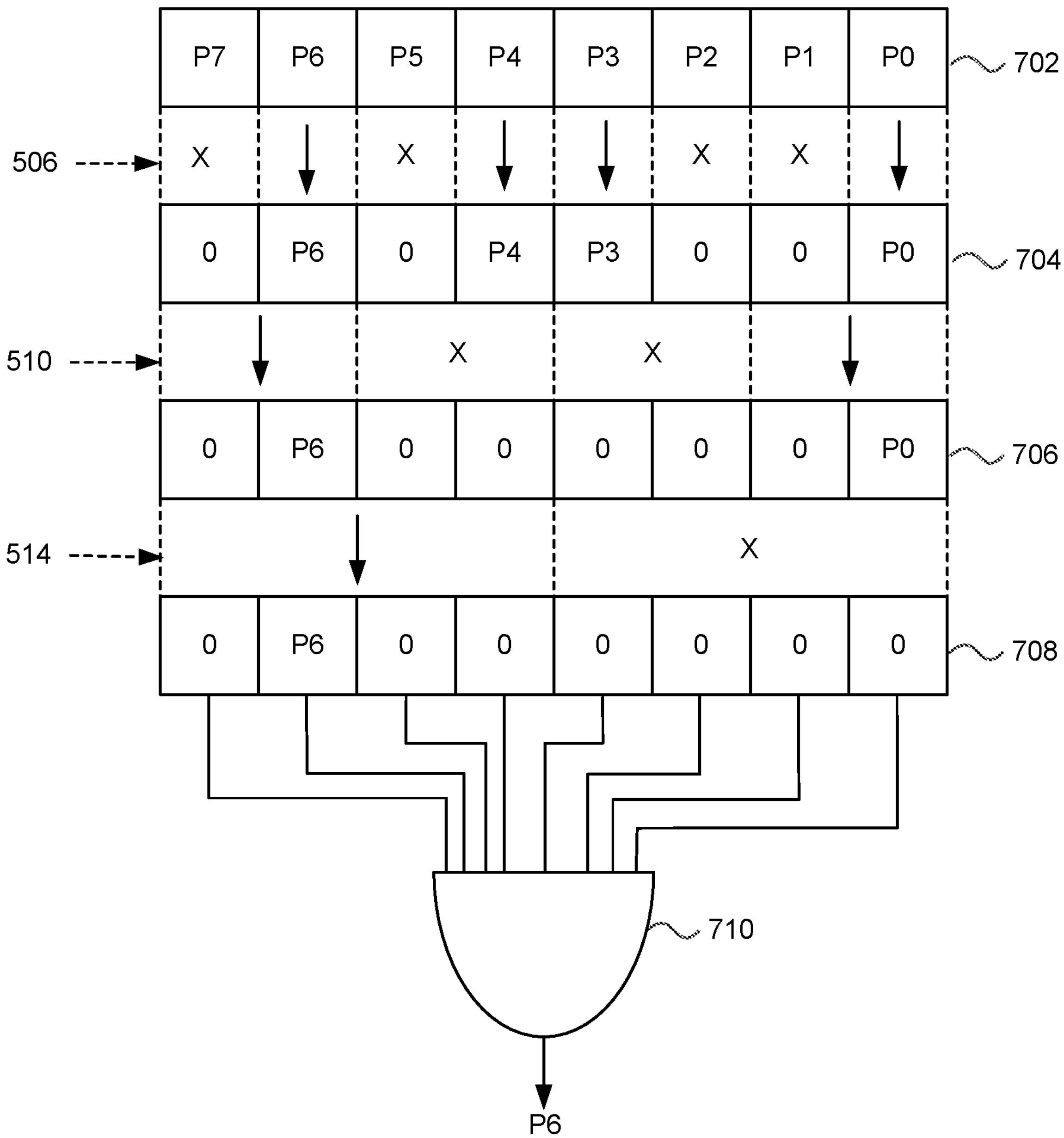
FIG. 7 is a schematic diagram showing an example method of selecting payload data using select signals.

In various examples, instead of using a one-hot signal to select the payload or multiplexing the payload data in the binary decision tree, the select signals for the decision nodes within the decision tree of the requestor selection logic 108 may be input to the payload selection logic 110 and used to select the payload for output to the resource 102. This is shown graphically in FIG. 7 and is based upon the example binary decision tree 500 shown on the left of FIG. 5A. Initially, the payload data comprises the payload data received from the requestors, labelled P0-P7. It will be appreciated that not all of the requestors R0-R7 may be active and so the arbiter may only receive payload data from the active requestors. In such examples, dummy payload data may be used for non-active requestors, where the dummy payload data may be populated with any data as it will be culled as part of the payload selection process. As shown in FIG. 7, the select signals from the requestor selection logic 108 are used to gradually, layer-by-layer, replace more of the payload data with zeros until the payload data comprises only the payload data for a single requestor along with many zeros.

The select signals 506 from the first layer of decision nodes in the decision tree 500 are configured to select the requestors R0, R3, R4 and R6, consequently, in the payload selection logic, the corresponding parts of the payload data 702, i.e. P0, P3, P4 and P6, are left unchanged (as indicated by the downwards arrows in FIG. 7), whilst the other parts of the payload data are replaced by zeros (as indicated by the Xs in FIG. 7), to generate updated payload data 704. In the next layer of decision nodes, the select signals 510 are configured to select requestors R0 and R6 and consequently, in the payload selection logic, the two corresponding sections of payload data (where a section of payload data corresponds to the payload data for requestors in the branch of the decision tree) are left unchanged (as indicated by the downwards arrows in FIG. 7). The rest of the payload data (some of which is already all zeros), which correspond to non-selected requestors, and hence non-selected branches of the decision tree, are set to all zeros (as indicated by the Xs in FIG. 7), to generate updated payload data 706. In the decision tree of FIG. 5A, there is only one further layer of decision nodes and in this final layer, the select signal 514 is configured to select requestor R6. Consequently, in the payload selection logic, the section of payload data is left unchanged (as indicated by the downwards arrow in FIG. 7), whilst the rest of the payload data (some of which is already all zeros) is set to all zeros (as indicated by the X in FIG. 7), to generate updated payload data 708 that comprises the original payload data for the selected requestor and many zeros. As there are no further layers of decision nodes in the tree, the updated payload data 708 is input to an OR-reduction stage 710 that removes all the data (which is now all zeros) corresponding to the non-selected requestors and outputs the payload data, P6, of the selected requestor, R6. The updated payload data 708 may be generated using a similar arrangement of AND logic elements 520, 522 as shown in FIG. 5B and described above. In such an example, the AND logic elements 520, 522 perform an AND with each bit of the payload data.

In further examples, a hybrid approach may be used to select the payload data which uses a combination of multiplexing the payload data through the decision tree at some stages (e.g. as in FIGS. 2 and 3) and OR-reduction (as in FIG. 7) at other stages.

Figure 8:
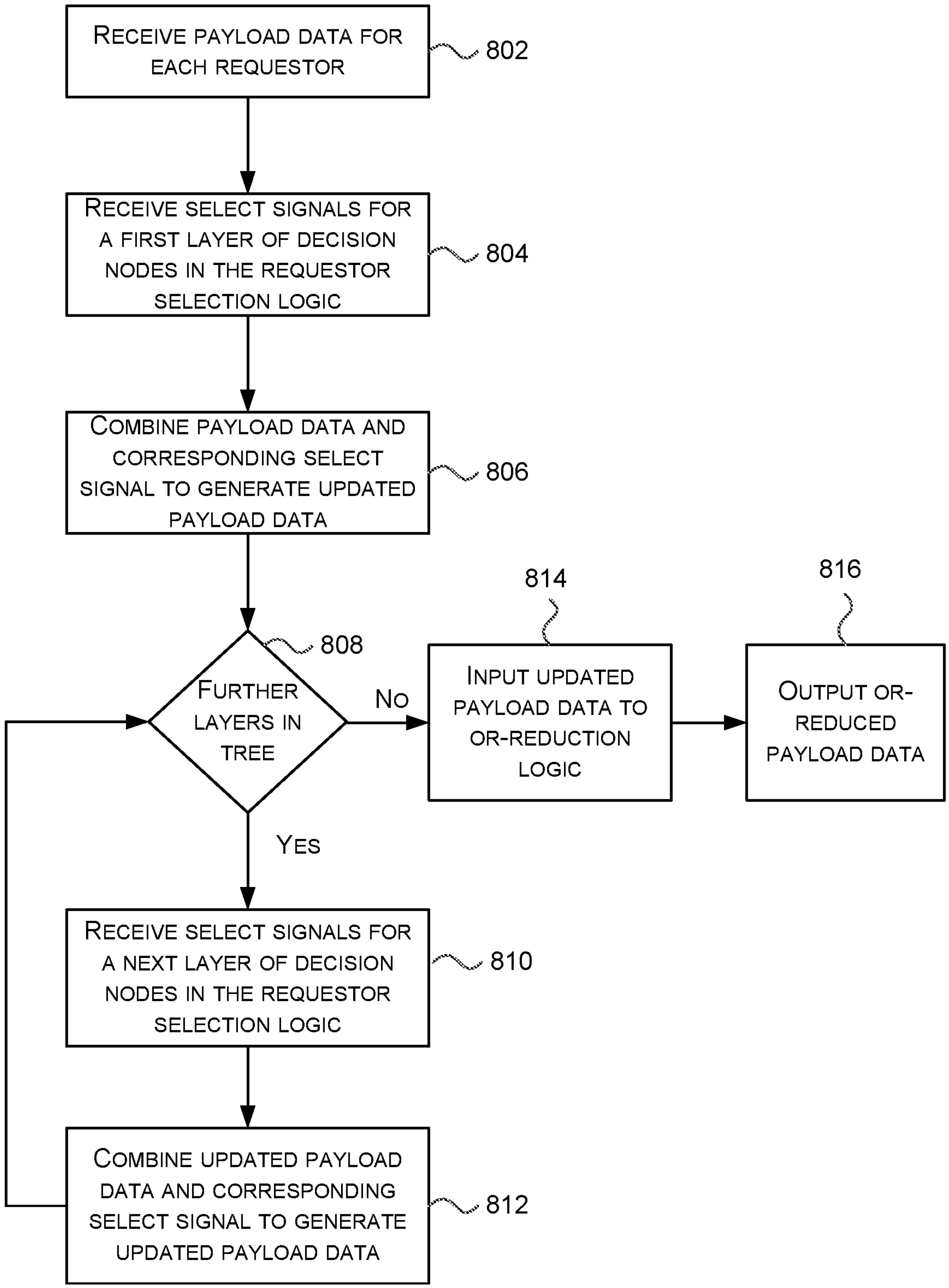
FIG. 8 shows a flow diagram of an example method of selecting, in an arbiter, the payload to forward to a shared resource.

FIG. 8 shows a flow diagram of an example method of selecting, in an arbiter, the payload to forward to a shared resource. As shown in FIG. 8, the method comprises receiving payload data for each requestor (block 802) or at least for each active requestor. As described above, payload data may not be received for non-active requestors and for these requestors, dummy payload data comprising all zeros may be used. Then, based on the select signals for the first layer of decision nodes in a decision tree in the requestor selection logic which are received (block 804), payload corresponding to the non-selected requestors are changed from the actual payload to all zeros to generate updated payload data (block 806). If there is more than one layer of decision nodes in the decision tree ('Yes' in block 808), select signals for the next layer in the decision tree are received (block 810) and used to update the payload data by setting the payload data elements that correspond to the non-selected branches of the decision tree (and hence the non-selected requestors) are set to all zeros (block 812). The method is repeated for each subsequent layer of decision nodes ('Yes' in block 808 followed by blocks 810-812) until the updated payload data has been further updated based on the select signals for every layer of decision nodes in the decision tree ('No' in block 808) and at that point the updated payload data, which now only comprises the original payload data for one of the requestors along with many zeros, is OR-reduced in an OR-reduction logic block (block 814) and the resulting payload data is output (block 816).

Figure 9:
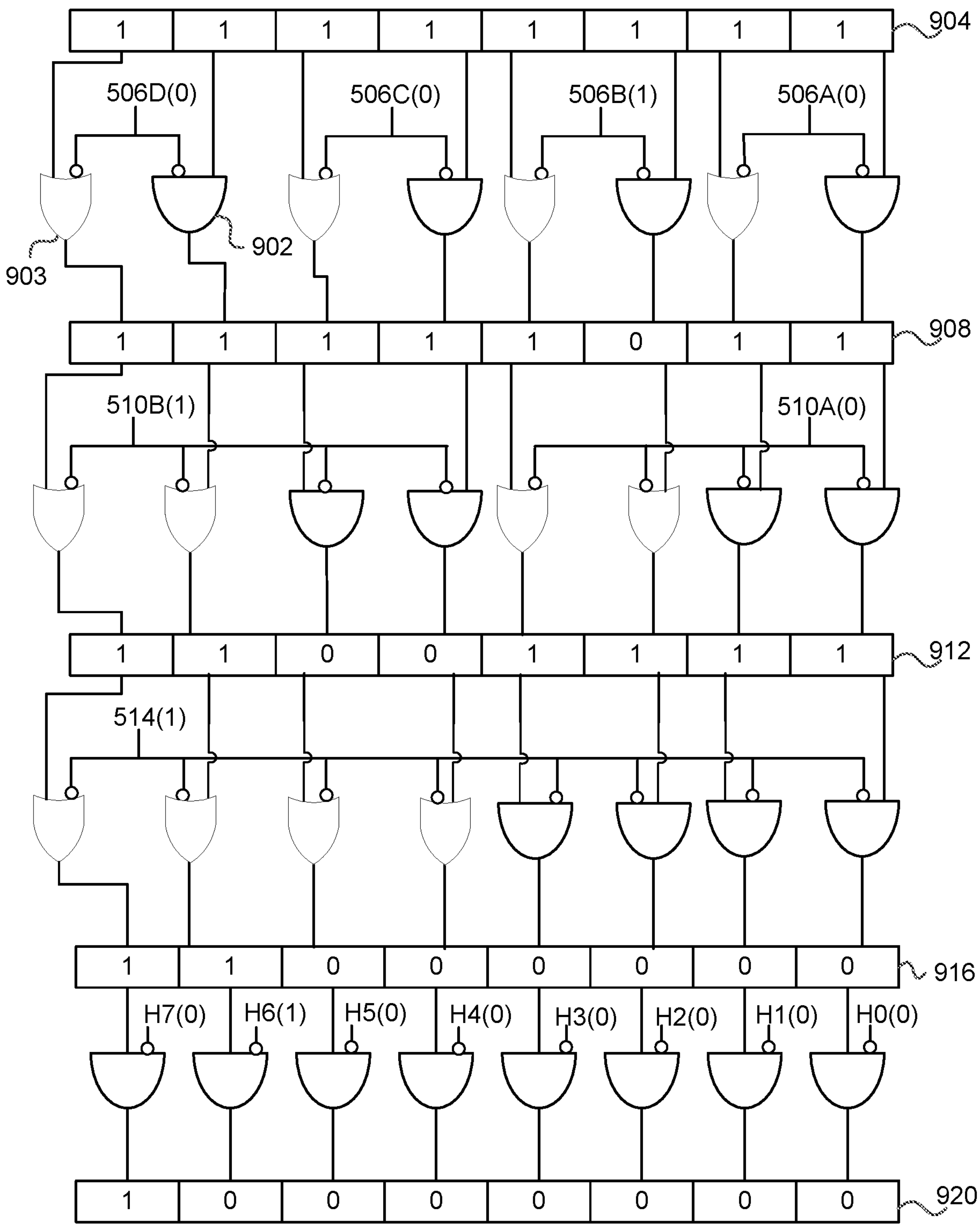
FIG. 9 is a schematic diagram of an example hardware implementation which may be used to update the common priority vector based on the select signals.

A variation on the technique described above with reference to FIGS. 5A, 5B and 6 may additionally be used by the priority control logic 112 to generate updated priority data for use in the next cycle in a round robin scheme. In such examples, a common vector of priority bits is stored for each layer in the decision tree and updated based on the select signals from the decision nodes in the particular layer. The common vector initially comprises all ones and at each layer in the decision tree the select signals are used to selectively update none, one or more ones in the vector with zeros, although as shown in FIG. 9 and described below, the logic used to perform this update differs from that shown in FIG. 5B. Following updating based on the select signals from the final layer of decision nodes in the decision tree, there is a further updating operation that is applied in order to generate the priority data for the next cycle. This operation may either comprise shifting all the bits in the vector by one place in the direction of the order in which the requestors are selected (e.g. in a right-first order in the examples shown) or performing a bit-wise AND with an inverted version of the one-hot vector (e.g. as generated using the method of FIG.

6). The resultant vector of priority bits comprises one bit per requestor and indicates whether the corresponding requestor has priority (which as noted above, may alternatively be referred as 'high priority') or not. This technique for generating the updated priority data may be faster than alternative methods such as generating the priority data for the next cycle after the generation of the one-hot vector and at the end of a cycle.

FIG. 9 is a schematic diagram of an example hardware implementation which may be used to update the common priority vector based on the select signals, which in this example are select left signals. As described above, the priority vector 904 initially comprises N+1 bits (where there are N+1 requestors identified R0-RN, as detailed above) and all bits are set to one. As shown in FIG. 9, the hardware arrangement comprises, at each stage, one logic element per requestor, where for all except the last stage, half the logic elements are AND logic elements 902 and the other half are OR logic elements 903. In the last stage, all of the logic elements are AND logic elements 902 and in all cases, one of the inputs to the logic elements 902, 903 is negated.

The first stage of the hardware arrangement corresponds to the first level of decision nodes in the decision tree 500. This first level of decision nodes in the decision tree 500 comprises four decision nodes and hence there are four select signals 506A-D (denoted select below and having values 0,1,0,0 respectively) and each select signal relates to the selection, or non-selection, of a branch comprising only a single leaf node and hence only a single requestor. As a result, the logic elements are logically grouped in pairs comprising an OR logic element 903 and an AND logic element 902. The OR logic element 903 in the pair is used to update the priority bit, $P_{left}$, in the common vector corresponding to the left input node of the decision node and implements the following logic (where $P_{left}'$ is the updated bit in the common vector):

$$P_{left}'=P_{left}\vee\overline{\text{select}}$$

The AND logic element in the pair 902 is used to update the priority bit, $P_{right}$, in the common vector corresponding to the right input node of the decision node and implements the following logic (where $P_{right}'$ is the updated bit in the common vector):

$$P_{right}'P_{right}\wedge\overline{\text{select}}$$

The output of the first stage of the hardware arrangement is an updated priority vector 908.

The second stage of the hardware arrangement takes the updated priority vector 908 and updates this further based on the select signals 510A-B (having values 0,1 in the example shown) from the second level of decision nodes to generate a further updated priority vector 912. As previously described, each of these select signals from the second level of decision nodes relates to the selection, or non-selection, of a branch comprising two leaf nodes (and hence two requestors). As a result, the logic elements 902, 903 are logically grouped in fours (two OR logic elements 903 and two AND logic elements 902) and within each group of four, the two bits in the common priority vector corresponding to the left branch that is input to a decision node in the second level are updated in the same way, i.e.:

$$P_{left}'=P_{left}\vee\overline{\text{select}}$$

Similarly, the two bits in the common priority vector corresponding to the right branch that is input to a decision node in this second level are updated in the same way, i.e.:

$$P_{right}'=P_{right}\wedge\overline{\text{select}}$$

In the third stage of the hardware arrangement, the updated priority vector 912 from the second stage is further updated based on the select signal 514 (having a value 1 in the example shown) from the third level of decision nodes, which is the final level in the example of FIG. 5A. The select signal relates to the selection, or non-selection, of a branch comprising four leaf nodes (and hence four requestors). As a result, the four bits of the common priority vector corresponding to the left branch that is input to the decision node are updated in the same way, i.e.:

$$P_{left}'=P_{left}\vee\overline{\text{select}}$$

Similarly, the four bits in the common vector corresponding to the right branch that is input to the decision node in this third level are updated in the same way, i.e.:

$$P_{right}'P_{right}\wedge\overline{\text{select}}$$

The output of the third stage of the hardware arrangement is an updated priority vector 916.

The final stage of the hardware arrangement is different from the preceding stages because it does not involve any select signals. Instead, it either performs a shifting of the bits in the direction of the order in which the requestors are selected (e.g. in a right-first order in the examples shown), or as in the example shown in FIG. 9, combines the priority vector 916 generated in the previous stage with the one-hot vector generated by the requestor selection logic 108 (e.g. as generated using the method of FIG. 6). Each bit, $P_i$, from the priority vector 916 (where i is the bit index) is combined with a negated version of the corresponding bit from the one-hot vector, $\overline{H}_l$, in an AND logic element 902, and hence is updated according to:

$$P_i'=P_i\wedge\overline{H}_t$$

The output of this final stage of the hardware arrangement is the priority vector 920 for the next cycle.

In the example shown in FIG. 9, the resulting priority vector 920 is a one followed by seven zeros. If, in another situation, in one cycle the left-most (or last) requestor has been selected (giving a one-hot vector of 10000000), then the resulting priority vector may be all zeros, such in the next cycle none have high priority, which means that the right-most active requestor will be selected. Alternatively, this may be treated as a special case and the priority vector may instead be set to all ones in the event that the resultant vector has all zeros after shifting or after combining with the one-hot vector (as described above).

In other examples, the updated priority data for use in the next cycle in a round robin scheme may be generated without using the hardware of FIG. 9. In such an example the updated priority data for use in the next cycle is generated using the one-hot vector of the current cycle (e.g. as generated using the method of FIG. 6). In this example the hardware logic left shifts the one-hot vector is shifted by one place, wrapping the left-most bit around so that it become the right-most bit, and then subtracts the left-shifted one-hot vector from zero (e.g. by inverting all the bits and then adding one to the result of the inversion). This generation will be slower than using the hardware of FIG. 9 but may be implemented in a smaller area.

Figure 10A:
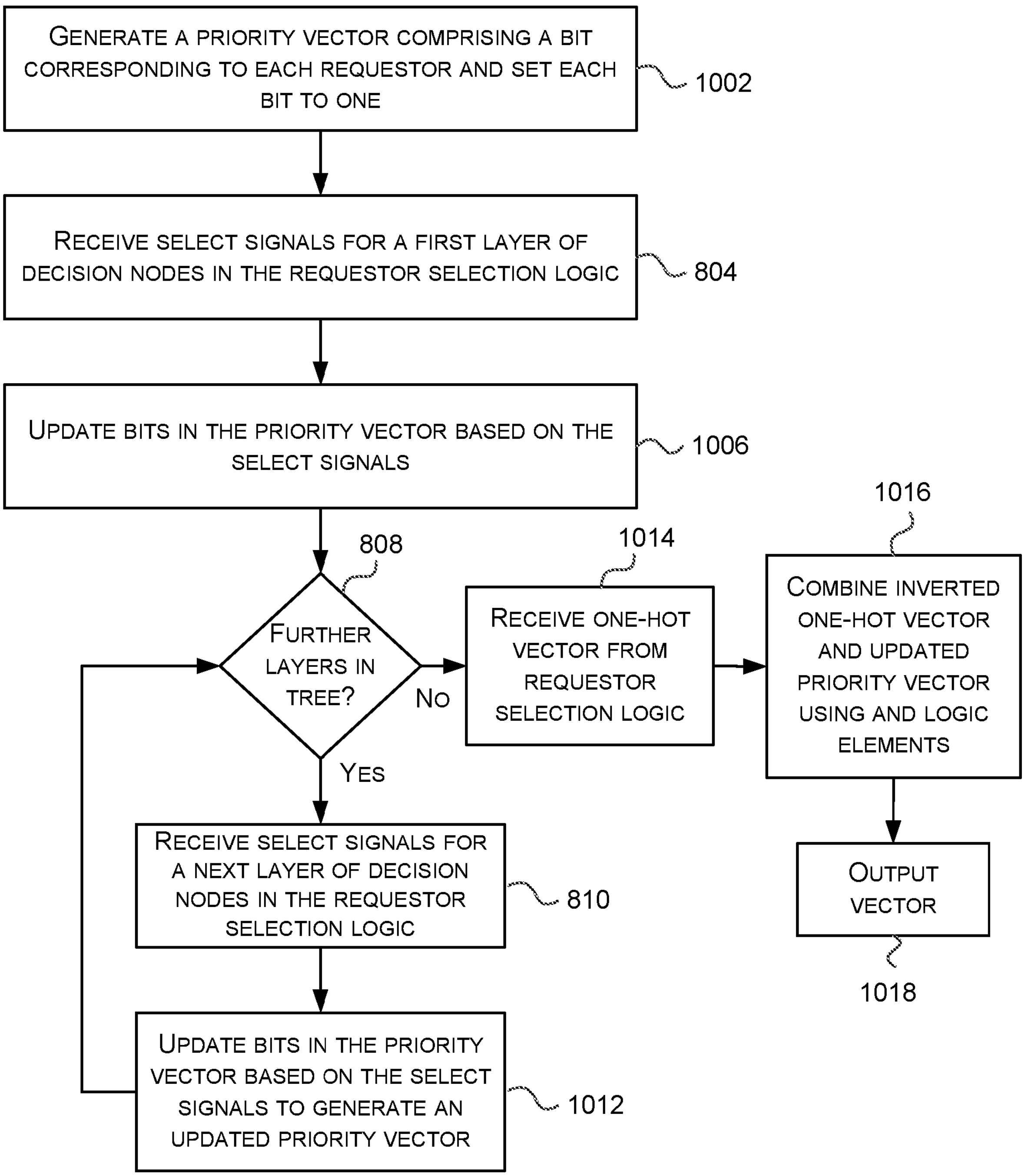
FIG. 10 shows a flow diagram of an example method of generating priority data in an arbiter for a next cycle based on select signals in a current cycle.

FIG. 10A shows a flow diagram of a first example method of generating priority data in an arbiter for a next cycle based on select signals in a current cycle, where the priority data may subsequently be used by requestor selection logic 108 within the arbiter to select a requestor in the next cycle. As shown in FIG. 10A, the method comprises generating a priority vector comprising the same number of bits as there are requestors (e.g. N+1 bits for the example shown in FIG. 1) and setting each bit in the common vector to one (block 1002). Then, based on the select signals for the first layer of decision nodes in a decision tree in the requestor selection logic which are received (block 804), none, one or more bits in the priority vector are changed from a one to a zero to generate an updated priority vector (block 1006). As described above, the updating may use the following logic:

$$P_{left}' = P_{left} \vee \overline{\text{select}}$$

$$P_{right}' = P_{right} \wedge \overline{\text{select}}$$

If there is more than one layer of decision nodes in the decision tree ('Yes' in block 808), select signals for the next layer in the decision tree are received (block 810) and used to further update the updated priority data by setting none, one or more bits in the priority vector to zero or one (block 1012). The updating may use the same logic as described above (and used in block 1006). The method is repeated for each subsequent layer of decision nodes ('Yes' in block 808 followed by blocks 810 and 1012) until the updated priority vector has been further updated based on the select signals for every layer of decision nodes in the decision tree ('No' in block 808) and at that point the updated priority vector is updated based on the one-hot vector for the current cycle that is received from the requestor selection logic 108 (block 1014). The updating of the priority vector involves a bit-wise-AND operation between bits from the priority vector and bits from an inverted version the one-hot vector (block 1016) and the resultant priority vector is output (block 1018).

Figure 10B:
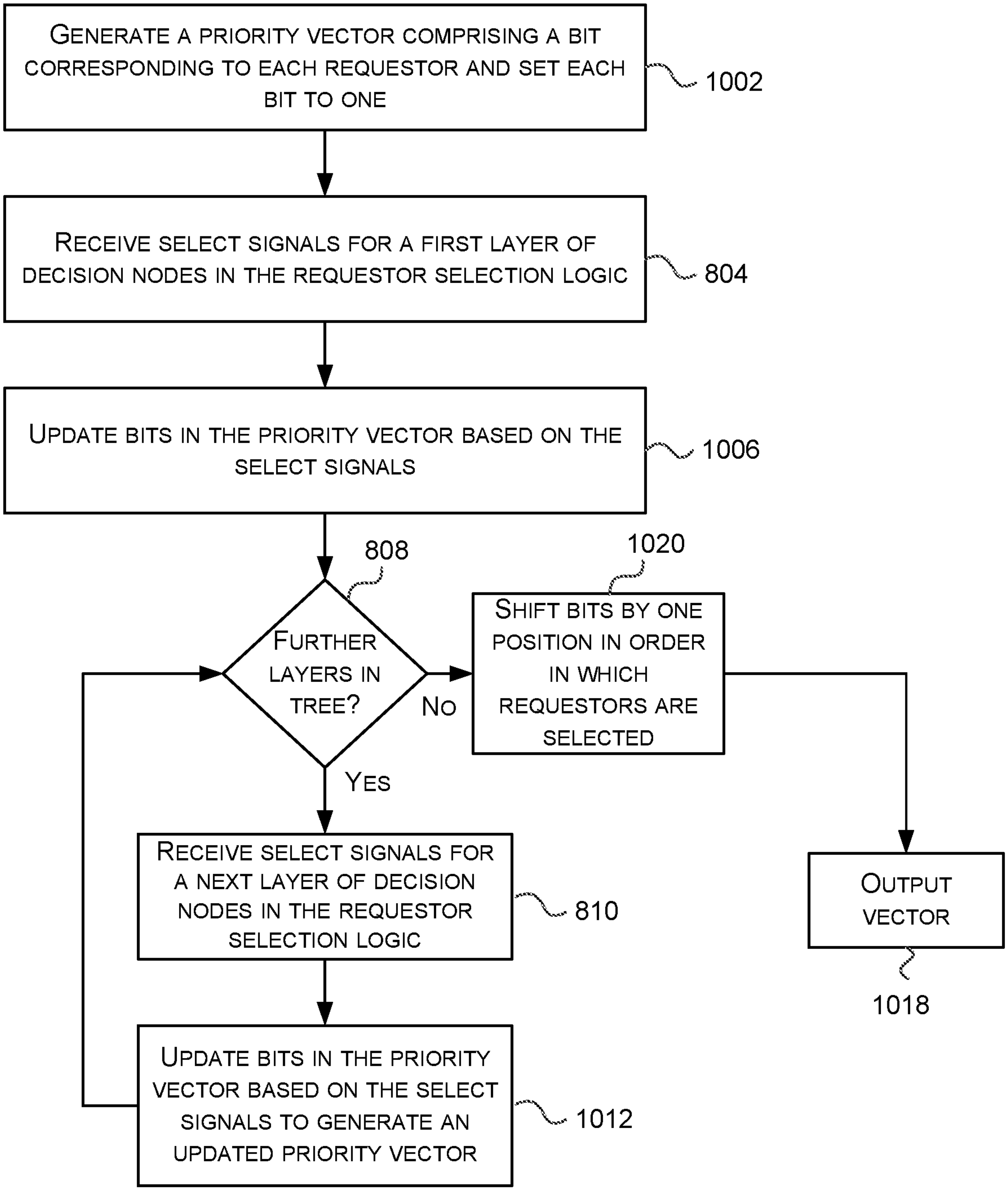

FIG. 10B shows a flow diagram of a second example method of generating priority data in an arbiter for a next cycle based on select signals in a current cycle, where the priority data may subsequently be used by requestor selection logic 108 within the arbiter to select a requestor in the next cycle. The method of FIG. 10B is the same as that shown in FIG. 10A (and described above), except for the final stages: instead of receiving the one-hot vector (in block 1014) and combining this with the updated priority vector (in block 1016), the updated priority vector (from block 1012) is shifted by one position in the direction of the order in which the requestors are selected (block 1020) e.g. in a right-first order, as in the examples shown, the shifting is by one bit to the left, and bits wrap round.

Each node 204 in the decision tree 200 shown in FIG. 2, along with the methods and hardware for generating a one-hot vector as shown in FIGS. 5A-6, methods and hardware for generating priority data for the next cycle as shown in FIGS. 9, 10A and 10B and methods and hardware for selecting payload data as shown in FIGS. 7-8, all use select signals. These select signals may be generated entirely within the decision tree 200, e.g. entirely within the select signal generation logic 304 in each decision node 204 based on the information about requestors that has propagated through the decision tree 200 to the particular decision node 204 (i.e. based on the information that is held at each child node of the particular decision node); however this means that the generation of select signals is in the critical path in each level of the decision tree (i.e. at each node, the selection of one of the child nodes cannot occur until the select signal has been generated at that node).

Described herein is a method of at least partially pre-generating the select signals separately from the decision tree. This reduces the critical path in each level and hence reduces delays. Additionally the technique results in hardware which is smaller in size (i.e. in area) for a fixed delay.

In particular, the select signals may be generated using two reduction trees of OR logic elements which is inherently quicker than using multiplexers. In addition to the two OR-reduction trees, there is a small amount of logic (e.g. one OR logic element and one AND logic element) per decision node and this may be located within the decision node (e.g. as the select signal generation logic 304, fed by inputs from the OR-reduction trees) or may be co-located with the OR-reduction trees, separately from the decision tree 200.

Figure 14:
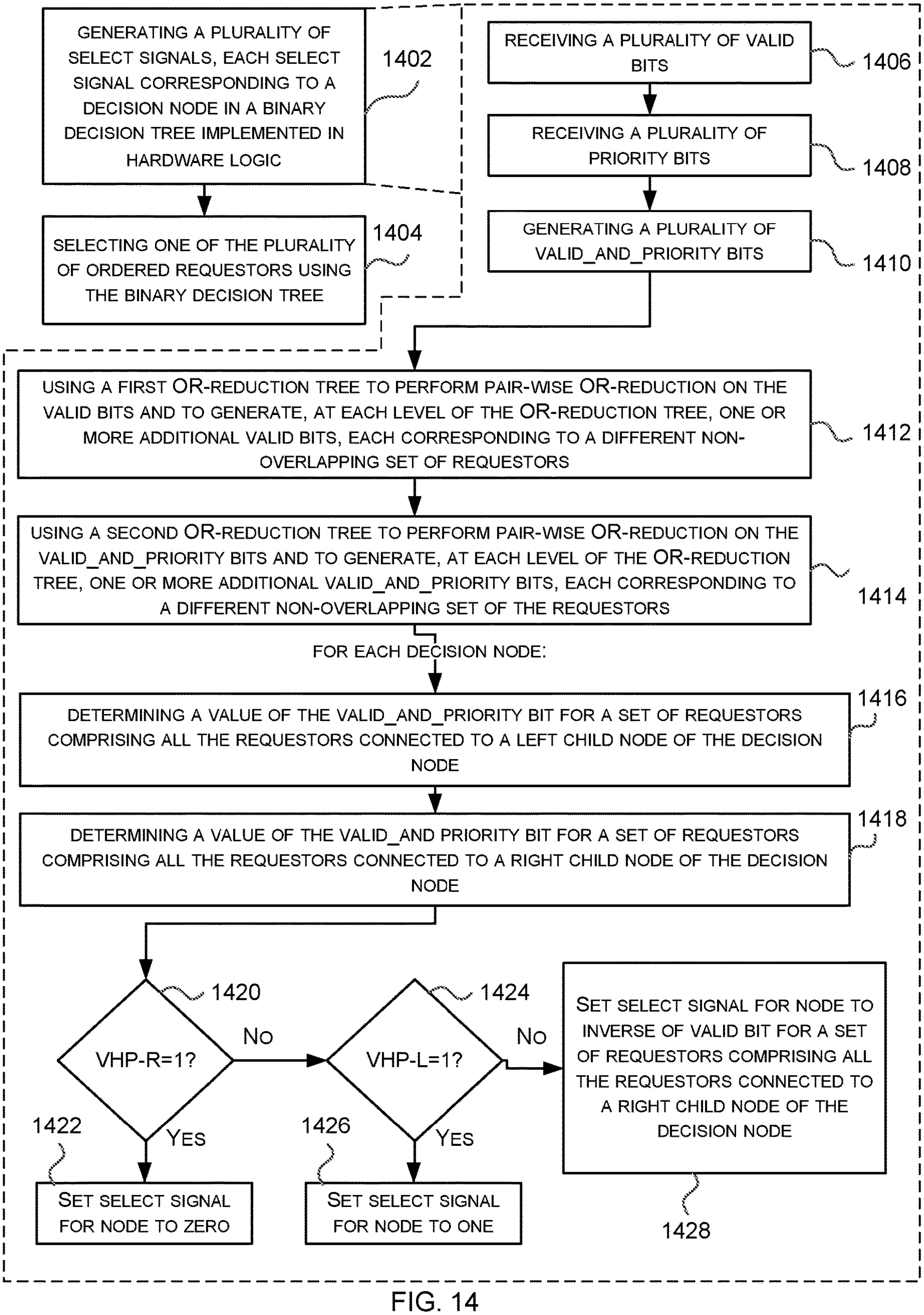
FIG. 14 shows a flow diagram of an example method of generating select signals for decision nodes in a binary decision tree.

The hardware arrangement for generating the select signals for a decision tree in an arbiter can be described with reference to FIGS. 11A-D and an example flow diagram of the method is shown in FIG. 14. As shown in FIG. 14, the method comprises, for each processing cycle: generating a plurality of select signals (block 1402), where each select signal corresponds to a decision node in a binary decision tree implemented in hardware logic; and selecting one of the plurality of ordered requestors using the binary decision tree (block 1404), where each decision node is configured to select one of two child nodes based on the select signal corresponding to the decision node and to propagate data corresponding to the selected child node.

Generating the plurality of select signals comprises: receiving a plurality of valid bits (block 1406), each valid bit corresponding to one of the plurality of requestors and indicating whether, in the processing cycle, the requestor is requesting access to the shared resource; receiving a plurality of priority bits (block 1408), each priority bit corresponding to one of the plurality of requestors and indicating whether, in the processing cycle, the requestor has priority; generating a plurality of valid_and_priority bits (block 1410), each valid_and_priority bit corresponding to one of the plurality of requestors, by combining, for each of the requestors, the corresponding valid bit and priority bits in an AND logic element; using a first OR-reduction tree to perform pair-wise OR-reduction on the valid bits and to generate, at each level of the OR-reduction tree, one or more additional valid bits, each corresponding to a different non-overlapping set of requestors (block 1412); and using a second OR-reduction tree to perform pair-wise OR-reduction on the valid_and_priority bits and to generate, at each level of the OR-reduction tree, one or more additional valid_and_priority bits, each corresponding to a different non-overlapping set of the requestors (block 1414). Then, for each decision node the following are determined: the value of the valid_and_priority bit for a set of requestors comprising all the requestors connected to a left child node of the decision node (block 1416) and a value of the valid_and_priority bit for a set of requestors comprising all the requestors connected to a right child node of the decision node (block 1418).

In response to determining that the value of the valid_and_priority bit for the set of requestors comprising all the requestors connected to the right child node of the decision node is equal to one ('Yes' in block 1420), the select signal for the node equal is set to zero (block 1422). In response to determining that the value of the valid_and_priority bit for the set of requestors comprising all the requestors connected to the right child node of the decision node is equal to zero ('No' in block 1420) and the value of the valid_and_priority bit for the set of requestors comprising all the requestors connected to the left child node of the decision node is equal to one ('Yes' in block 1424), the select signal for the node equal is set to one (block 1426). Finally, in response to determining that both the value of the valid_and_priority bit for the set of requestors comprising all the requestors connected to the left child node of the decision node and the value of the valid_and_priority bit for the set of requestors comprising all the requestors connected to the right child node of the decision node are equal to zero ('No' in both blocks 1420 and 1424), a value of the valid bit for a set of requestors comprising all the requestors connected to the right child node of the decision node is determined and the select signal for the node equal is set to an inverse of this determined valid bit value (block 1428).

Figure 11A:
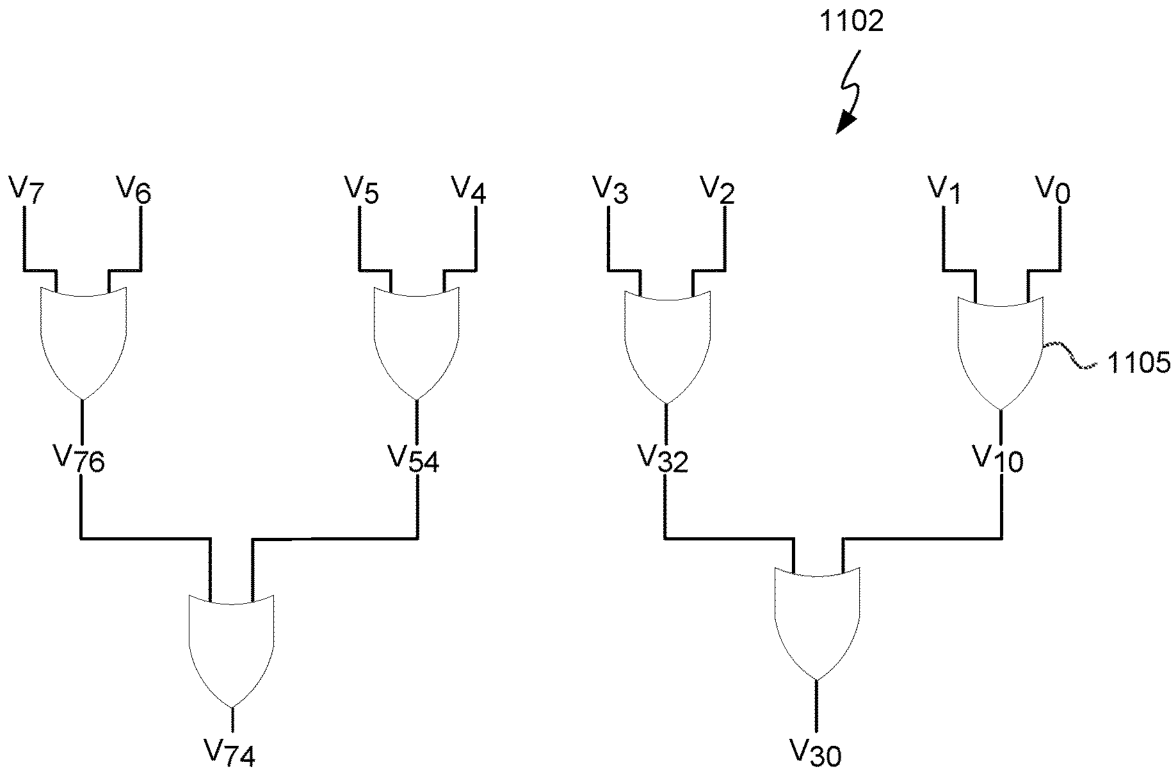
FIGS. 11A and 11B are schematic diagrams of two OR-reduction trees that may be used to generate select signals for decision nodes in a binary decision tree.
Figure 11B:
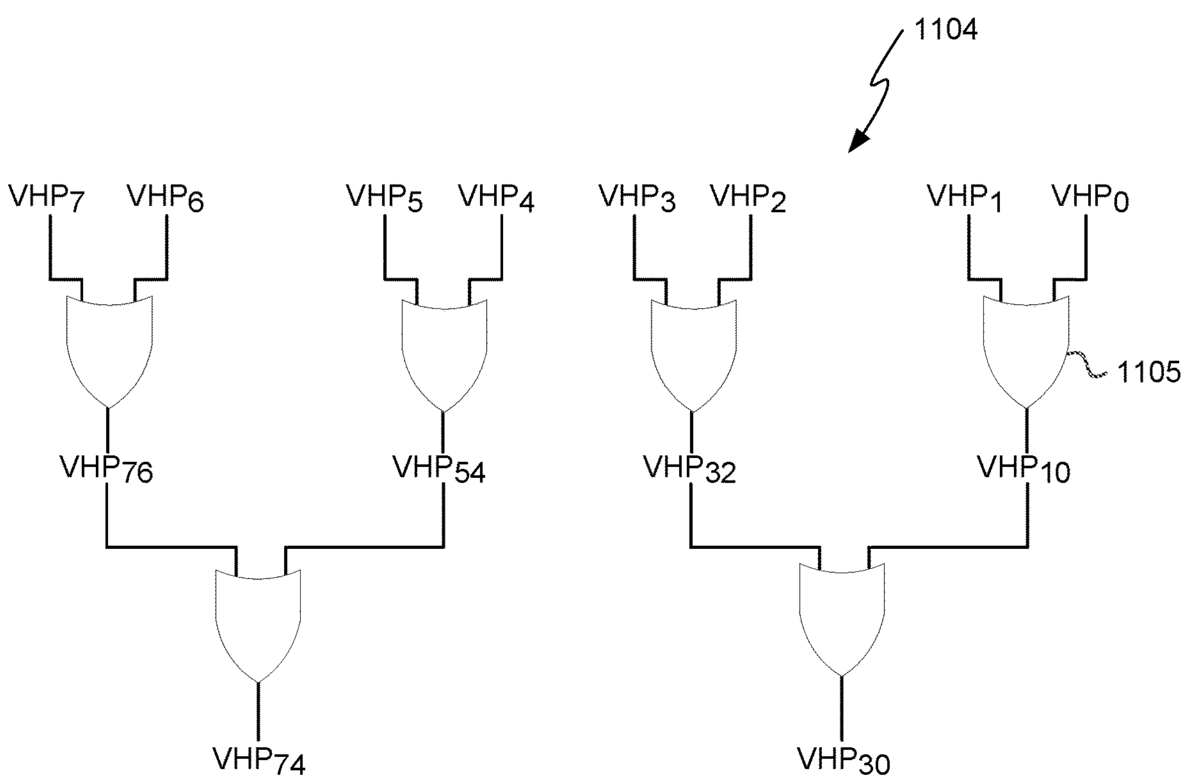
Figure 11C:
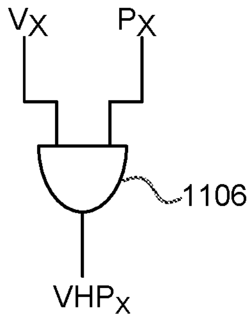
FIG. 11C is a schematic diagram of hardware for generating a valid_and_priority bit for a requestor.
Figure 11D:
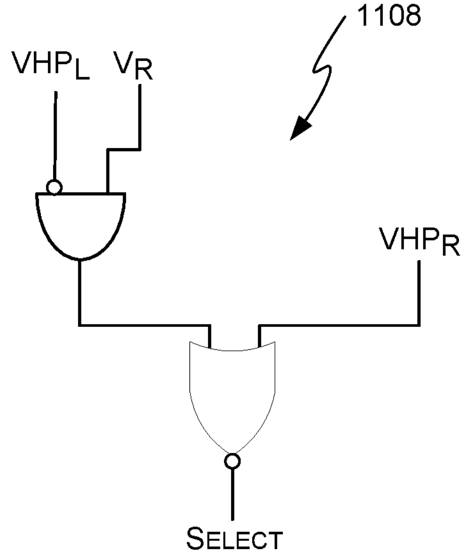
FIG. 11D is a schematic diagram of a select signal generation element.

FIGS. 11A and 11B show the two OR-reduction trees 1102, 1104, each comprising a plurality of OR logic elements 1105. The OR-reduction tree 1102 shown in FIG. 11A performs pair-wise OR-reduction on the valid bits for each of the requestors and the second OR-reduction tree 1104 shown in FIG. 11B performs pair-wise OR-reduction on the valid_and_priority bits for each of the requestors. The valid bits that are reduced by the first OR-reduction tree 1102 are denoted $V_x$ below, where x is the index of the requestor, e.g. x=0 for R0, x=7 for R7, or identifies the range of requestors for decision nodes in the second and subsequent layers within the decision tree, e.g. x=30 for requestors R0-R3, x=74 for requestors R4-R7. The valid_and_priority bits that are reduced by the second OR-reduction tree 1104 are denoted $VHP_x$ below and each valid_and_priority bit is generated by combining the valid bit, $V_x$, for a single requestor Rx, and the priority bit, $P_x$, for the same requestor, using an AND logic element 1106, as shown in FIG. 11C. In addition to the two OR-reduction trees 1102, 1104, the hardware arrangement further comprises a select signal generation element 1108 for each select signal, i.e. for each decision node in the decision tree, and the structure of the select signal generation element 1108 is shown in FIG. 11D. As noted above, this select signal generation element 1108 may be implemented within each decision node (e.g. as the signal select generation logic 304 shown in FIG. 3) or may be co-located with the OR-reduction trees 1102, 1104. As shown in FIG. 11D, the select signal generation element 1108 comprises an AND logic element and an OR logic element and the select signal is generated using the following logic:

$$\text{select}=\overline{(VHP_{\mathrm{R}} \vee (V_{\mathrm{R}} \wedge \overline{\mathrm{VHP}_{\mathrm{L}}})}$$

where $VHP_R$ is the valid_and_priority bit from the valid_and_priority OR-reduction tree 1104 for the set of requestors connected to the right child node of the decision node, $VHP_L$ is the valid_and_priority bit from the valid_and_priority OR-reduction tree 1104 for the set of requestors connected to the left child node and $V_R$ is the valid bit from the valid OR-reduction tree 1102 for the set of requestors connected to the right child node.

Referring to the decision tree 200 shown in FIG. 2, where the decision nodes 204 are labelled A-G, the signals used in the select signal generation element 1108 for each decision node is shown in the table below:

| Decision Node | Left Set of Requestors | Right Set of Requestors | $VHP_L$ | $VHP_R$ | $V_R$ |
|---|---|---|---|---|---|
| A | R1 | R0 | $VHP_1$ | $VHP_0$ | $V_0$ |
| B | R3 | R2 | $VHP_3$ | $VHP_2$ | $V_2$ |
| C | R5 | R4 | $VHP_5$ | $VHP_4$ | $V_4$ |
| D | R7 | R6 | $VHP_7$ | $VHP_6$ | $V_6$ |
| E | R2, R3 | R0, R1 | $VHP_{32}$ | $VHP_{10}$ | $V_{10}$ |
| F | R6, R7 | R4, R5 | $VHP_{76}$ | $VHP_{54}$ | $V_{54}$ |
| G | R4-R7 | R0-R3 | $VHP_{74}$ | $VHP_{30}$ | $V_{30}$ |

Figure 11E:
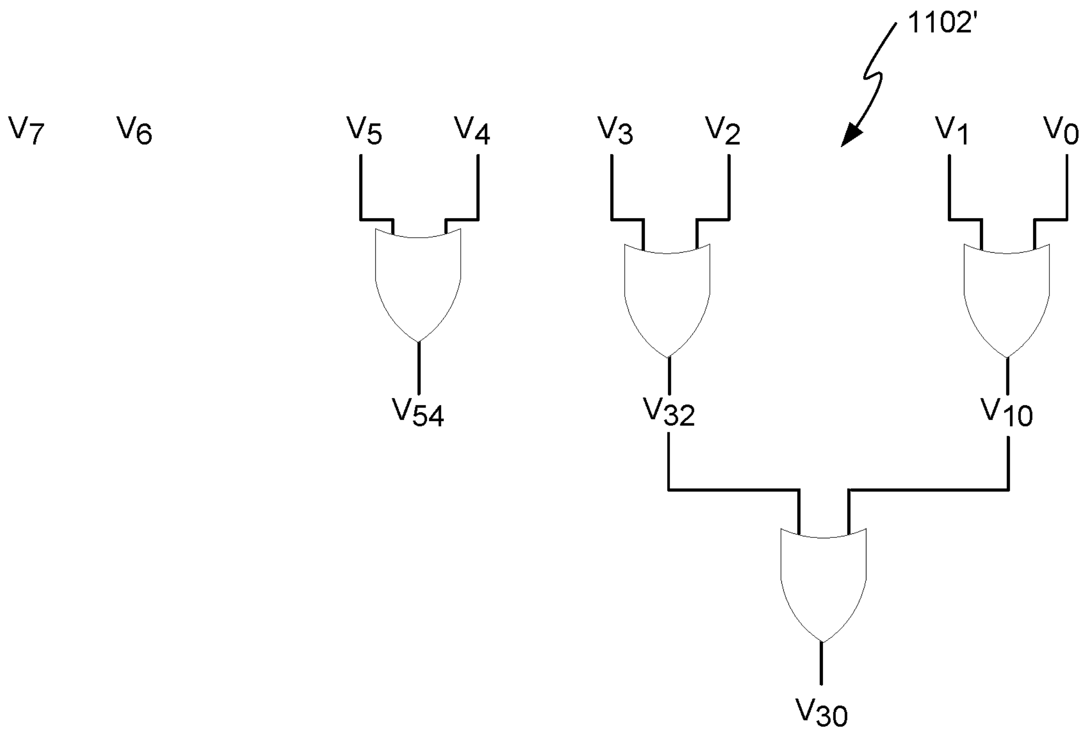
FIG. 11E is a schematic diagram of a further example OR-reduction tree that may be used to generate select signals for decision nodes in a binary tree.

Referring to the table above, it can be seen that all of the valid_and_priority bits generated using the valid_and_priority OR-reduction tree 1104 are used in generating the select signals for the decision tree 200 shown in FIG. 2. In contrast, not all of the valid bits generated by the valid OR-reduction tree 1102 are used (in particular, the final $V_L$ result is not needed each level of the OR-reduction tree, e.g. $V_{76}$ and $V_{74}$ are not needed in the example of FIG. 2). Consequently, some of the OR logic elements (i.e. those OR logic elements that generate only the final $V_L$ result in each level of the OR-reduction tree) may be omitted from the OR-reduction tree, as shown in FIG. 11E. In some examples, however, generation of a final complete OR-reduce result $V_{70}$ may be useful as it provides a signal that indicates that at least one valid bit is a one (i.e. at least one requestor is active) and in which case, the OR-reduction tree of FIG. 11A may be supplemented by a further OR logic element that takes as inputs $V_{74}$ and $V_{30}$ and outputs $V_{70}$.

The truth table for the select signal generation element 1108 is as follows:

| $VHP_L$ | $VHP_R$ | select |
|---|---|---|
| 0 | 0 | $\overline{V_R}$ |
| 0 | 1 | 0 |
| 1 | 0 | 1 |
| 1 | 1 | 0 |

and from this it can be seen that unless both the valid_and_priority bits are zeros, the bit from the valid OR-reduction tree 1102, 1102' does not affect the value of the select signal (i.e. the bit from the valid OR-reduction tree 1102, 1102') is not required.

It will be appreciated that whilst particular logic arrangements are shown in the drawings and described above, any of these may be replaced by various logical equivalents, such as replacing an OR-reduction tree with hardware that performs NAND-reducing of the inverse of the bits, calculating a select signal that determines whether the right branch is selected (instead of the select signal indicating whether the right branch is selected as above), etc.

By using an OR-reduction tree as described above to generate the select signals, this additionally removes the fan-out of the select signals that would otherwise be in the critical path between levels of the binary decision tree and consequently may assist in providing the grant/enable signals earlier than the payload data.

Various techniques for improving arbiter hardware and methods of arbitration are described above. These include: methods and hardware for selecting payload data as described with reference to FIG. 4; alternative methods and hardware for selecting payload data as described with reference to FIGS. 7-8; methods and hardware for generating a one-hot signal as described with reference to FIGS. 5A-6; methods and hardware for generating priority data for the next cycle as described with reference to FIGS. 9-10; and methods and hardware for generating select signals as described with reference to FIGS. 11A-E. As noted above, each of these may be used independently or they may be used in combination with one or more of the other techniques described herein.

In various examples, arbiter hardware and methods of arbitration may use the methods described above to generate the select signals and the methods of generating a one-hot signal as described above (which uses the select signals generated using the OR-reduction trees). By using this combination, the minimum delay that can be achieved is reduced and the size of the hardware that is required to achieve a particular delay is also reduced (given that typically, to reduce the delay requires a larger area of hardware logic). The one-hot signal that is generated may then be used to select the payload data (as described above with reference to FIG. 4) and/or to generate the priority data for the next cycle (as described above). By additionally using the one-hot signal to select the payload data, it is possible to further reduce the area of hardware that is required to achieve a particular delay and this may be more useful for larger, rather than smaller delays.

In other examples, arbiter hardware and methods of arbitration may use the methods described above to generate the select signals and then may use these select signals directly to select the payload data (as described above with reference to FIGS. 7-8). The one-hot signal may optionally also be generated and used to generate the priority data for the next cycle (as described above). This may, for example, be used where the timing for obtaining the payload data is critical but the timing for obtaining the priority data for the next cycle is not.

In further examples, the methods of selecting the payload data (as described above with reference to FIG. 4) may be used in combination with any method of generating the one-hot signal.

In various examples, the method of generating the priority data for the next cycle (as described with reference to FIG. 9) may be used with any method of generating the one-hot signal. This may be used, for example, where the timing for obtaining the priority data for the next cycle is critical.

Figure 12:
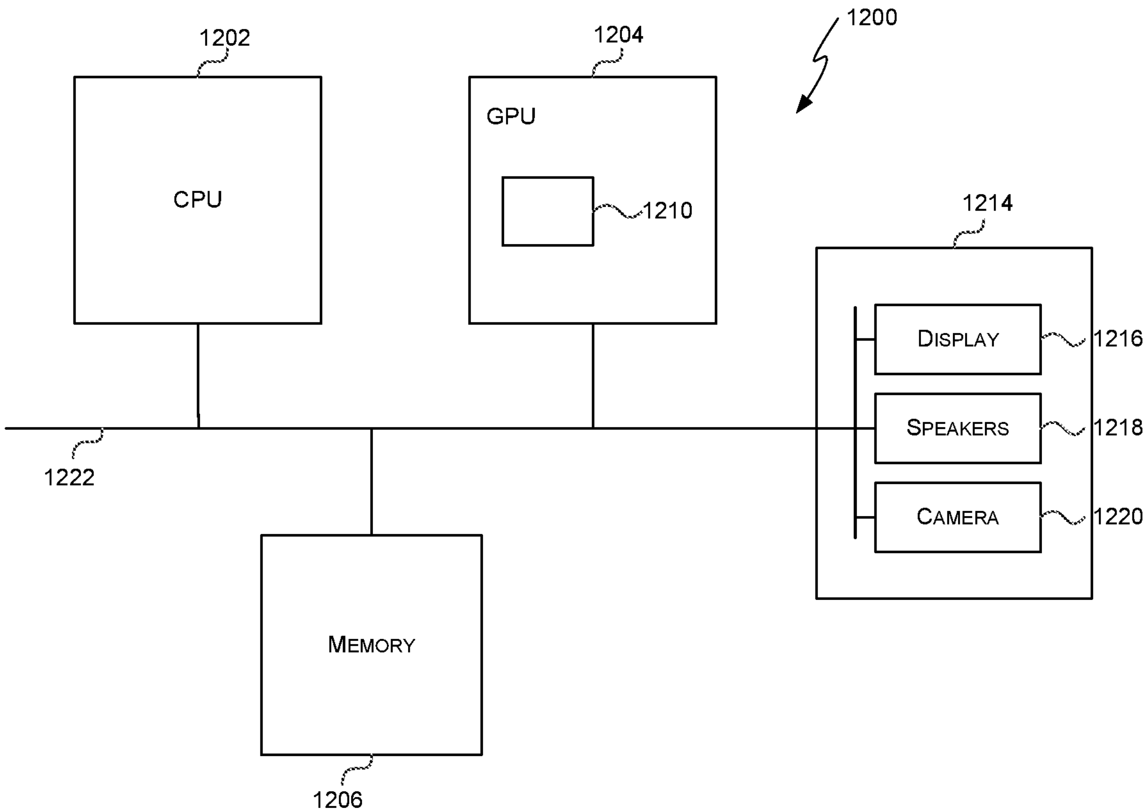
FIG. 12 shows a computer system in which an arbiter is implemented.

FIG. 12 shows a computer system in which an arbiter as described herein may be implemented. The computer system comprises a CPU 1202, a GPU 1204, a memory 1206 and other devices 1214, such as a display 1216, speakers 1218 and a camera 1220. An arbiter (or other logic block that implements one of the methods described herein) 1210 may implemented on the GPU 1204. In other examples, the arbiter 1210 may be implemented on the CPU 1202. The components of the computer system can communicate with each other via a communications bus 1222.

The arbiter 106 in FIG. 1 is shown as comprising a number of functional blocks. This is schematic only and is not intended to define a strict division between different logic elements of such entities. Each functional block may be provided in any suitable manner. It is to be understood that intermediate values described herein as being formed by any of the functional blocks within the arbiter 106 need not be physically generated by the particular functional block at any point and may merely represent logical values which conveniently describe the processing performed by the arbiter between its input and output.

The arbiters described herein may be embodied in hardware on an integrated circuit. The arbiters described herein may be configured to perform any of the methods described herein. Generally, any of the functions, methods, techniques or components described above can be implemented in software, firmware, hardware (e.g., fixed logic circuitry), or any combination thereof. The terms “module,” “functionality,” “component”, “element”, “unit”, “block” and “logic” may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL®. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term ‘computer’ includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an arbiter configured to perform any of the methods described herein, or to manufacture an arbiter comprising any apparatus described herein. An integrated circuit definition dataset may be, for example, an integrated circuit description.

Therefore, there may be provided a method of manufacturing, at an integrated circuit manufacturing system, an arbiter as described herein. Furthermore, there may be provided an integrated circuit definition dataset that, when processed in an integrated circuit manufacturing system, causes the method of manufacturing an arbiter to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an arbiter will now be described with respect to FIG. 13.

Figure 13:
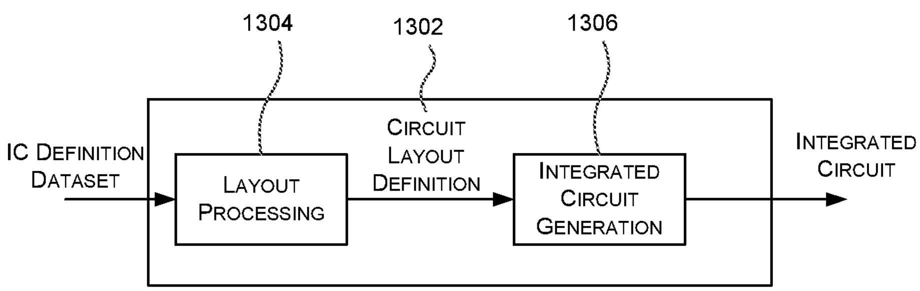
FIG. 13 shows an integrated circuit manufacturing system for generating an integrated circuit embodying an arbiter.

FIG. 13 shows an example of an integrated circuit (IC) manufacturing system 1302 which is configured to manufacture an arbiter as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining an arbiter as described in any of the examples herein), process the IC definition dataset, and generate an IC according to the IC definition dataset (e.g. which embodies an arbiter as described in any of the examples herein). The processing of the IC definition dataset configures the IC manufacturing system 1302 to manufacture an integrated circuit embodying an arbiter as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an arbiter without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of arbitrating between a plurality of ordered requestors and a shared resource in a computing system, the method comprising:

generating a one-hot vector separately from, but in parallel with, a binary decision tree, the one-hot vector comprising a plurality of bits having a value of zero and a single bit having a value of one; and granting access to the shared resource to the requestor corresponding to the bit having a value of one, wherein access is granted for a current processing cycle, wherein generating a one-hot vector separately from, but in parallel with a decision tree, comprises:

generating a vector comprising one bit corresponding to each requestor and setting each bit in the vector to one;

based on a plurality of select signals, each select signal corresponding to a different decision node in a first layer of the binary decision tree implemented in hardware logic, setting bits in the vector corresponding to non-selected requestors to zero, wherein each select signal is configured to be used by the corresponding decision node in the binary decision tree to select one of two child nodes; and for each subsequent layer in the binary decision tree and based on one or more select signals corresponding to different decision nodes in the subsequent layer of the binary decision tree, setting bits in the vector corresponding to non-selected requestors to zero.

2. The method according to claim 1, wherein for any decision node in the binary decision tree, there is a corresponding select signal and two corresponding sets of bits in the vector, a left set and a right set, the left set comprising bits corresponding to requestors connected to a left input node of the decision node and the right set comprising bits corresponding to requestors connected to a right input node of the decision node and wherein setting bits in the vector corresponding to non-selected requestors to zero comprises, for each select signal:

if the select signal has a first pre-defined value, setting all the bits in the right set to zero and leaving all the bits in the left set unchanged; and if the select signal has a second pre-defined value, setting all the bits in the left set to zero and leaving the bits in the right set unchanged.

3. The method according to claim 2, wherein the first pre-defined value is one and the second pre-defined value is zero.

4. The method according to claim 1, further comprising:

receiving payload data from one or more of the plurality of ordered requestors; and selecting payload data, from the received payload data, to output to the shared resource using the one-hot vector.

5. The method according to claim 4, wherein selecting payload data, from the received payload data, to output to the shared resource using the one-hot vector comprises:

for each requestor, combining, in an AND logic element, the payload data from the requestor and a corresponding bit from the one-hot vector to generate updated payload data for the requestor; and combining the updated payload data for each of the requestors in an OR-reduction stage.

6. The method according to claim 1, further comprising:

generating priority data for a next processing cycle using the one-hot vector.

7. The method according to claim 6, wherein generating priority data for a next processing cycle using the one-hot vector comprises:

generating a priority vector comprising one bit corresponding to each requestor and setting each bit in the vector to one;

based on the plurality of select signals corresponding to different decision nodes in the first layer of the binary decision tree, updating one or more bits in the priority vector; and for each subsequent layer in the binary decision tree and based on the one or more select signals corresponding to different decision nodes in the subsequent layer of the binary decision tree, updating one or more bits in the priority vector; and prior to outputting the priority vector, inverting the one-hot vector and updating each bit in the priority vector by combining, in an AND logic element, each bit in the priority vector with a corresponding bit in the inverted one-hot vector, wherein for any decision node in the binary decision tree, there is a corresponding select signal and two corresponding sets of bits in the priority vector, a left set and a right set, the left set comprising bits corresponding to requestors connected to a left input node of the decision node and the right set comprising bits corresponding to requestors connected to a right input node of the decision node and wherein updating one or more bits in the priority vector comprises, for each select signal in the layer of the binary decision tree:

if the select signal has a value of one, setting all the bits in the right set to zero and leaving all the bits in the left set unchanged; and if the select signal has a value of zero, setting all the bits in the left set to one and leaving the bits in the right set unchanged.

8. The method according to claim 6, wherein generating priority data for a next processing cycle using the one-hot vector comprises:

generating a priority vector comprising one bit corresponding to each requestor and setting each bit in the vector to one;

based on the plurality of select signals corresponding to different decision nodes in the first layer of the binary decision tree, updating one or more bits in the priority vector; and for each subsequent layer in the binary decision tree and based on the one or more select signals corresponding to different decision nodes in the subsequent layer of the binary decision tree, updating one or more bits in the priority vector; and prior to outputting the priority vector, updating each bit in the priority vector by shifting it by one bit position to the left, wherein for any decision node in the binary decision tree, there is a corresponding select signal and two corresponding sets of bits in the priority vector, a left set and a right set, the left set comprising bits corresponding to requestors connected to a left input node of the decision node and the right set comprising bits corresponding to requestors connected to a right input node of the decision node and wherein updating one or more bits in the priority vector comprises, for each select signal in the layer of the binary decision tree:

if the select signal has a value of one, setting all the bits in the right set to zero and leaving all the bits in the left set unchanged; and if the select signal has a value of zero, setting all the bits in the left set to one and leaving the bits in the right set unchanged.

9. The method according to claim 1, wherein the select signals are generated in the nodes of the binary decision tree.

10. The method according to claim 1, further comprising generating the plurality of select signals.

11. The method according to claim 10, wherein generating the plurality of select signals comprises:

receiving a plurality of valid bits for each processing cycle, each valid bit corresponding to one of the plurality of requestors and indicating whether, in the processing cycle, the requestor is requesting access to the shared resource;

receiving a plurality of priority bits for each processing cycle, each priority bit corresponding to one of the plurality of requestors and indicating whether, in the processing cycle, the requestor has priority;

generating a plurality of valid_and_priority bits for each processing cycle, each valid_and_priority bit corresponding to one of the plurality of requestors, by combining, for each of the requestors, the corresponding valid bit and priority bits in an AND logic element;

using a first OR-reduction tree to perform pair-wise OR-reduction on the valid bits and to generate, in each processing cycle and at each level of the OR-reduction tree, one or more additional valid bits, each corresponding to a different non-overlapping set of requestors;

using a second OR-reduction tree to perform pair-wise OR-reduction on the valid_and_priority bits and to generate, in each processing cycle and at each level of the OR-reduction tree, one or more additional valid_and_priority bits, each corresponding to a different non-overlapping set of the requestors; and for each processing cycle and each decision node:

determining a value of the valid_and_priority bit for a set of requestors comprising all the requestors connected to a left child node of the decision node;

determining a value of the valid_and_priority bit for a set of requestors comprising all the requestors connected to a right child node of the decision node;

in response to determining that the value of the valid_and_priority bit for the set of requestors comprising all the requestors connected to the right child node of the decision node is equal to one, setting a select signal for the node equal to zero;

in response to determining that the value of the valid_and_priority bit for the set of requestors comprising all the requestors connected to the left child node of the decision node is equal to one and the value of the valid_and_priority bit for the set of requestors comprising all the requestors connected to the right child node of the decision node is equal to zero, setting the select signal for the node equal to one; and in response to determining that both the value of the valid_and_priority bit for the set of requestors comprising all the requestors connected to the left child node of the decision node and the value of the valid_and_priority bit for the set of requestors comprising all the requestors connected to the right child node of the decision node are equal to zero, determining a value of the valid bit for a set of requestors comprising all the requestors connected to the right child node of the decision node and setting the select signal for the node equal to an inverse of the valid bit.

12. An arbiter configured to arbitrate between a plurality of ordered requestors and a shared resource in a computing system, the arbiter comprising requestor selection logic and the requestor selection logic comprising:

a binary decision tree implemented in hardware logic and comprising a plurality of input nodes and a plurality of decision nodes, each input node corresponding to one of the requestors wherein each decision node in the binary decision tree is arranged, based on a select signal, to select one of two child nodes; and hardware logic arranged to generate a one-hot vector separately from, but in parallel with, the binary decision tree, the one-hot vector comprising a plurality of bits having a value of zero and a single bit having a value of one, the hardware logic comprising:

hardware logic arranged to generate a vector comprising one bit corresponding to each requestor and set each bit in the vector to one; and hardware logic arranged, for each layer in the binary decision tree, to update one or more bits in the vector based on selections made at decision nodes in the layer such that bits in the vector corresponding to non-selected requestors are zero, and the arbiter is further arranged to grant access to the shared resource to the requestor corresponding to the bit having a value of one, wherein access is granted for a current processing cycle.

13. The arbiter according to claim 12, wherein for any decision node in the binary decision tree, there is a corresponding select signal and two corresponding sets of bits in the vector, a left set and a right set, the left set comprising bits corresponding to requestors connected to a left input node of the decision node and the right set comprising bits corresponding to requestors connected to a right input node of the decision node and wherein each decision node is arranged to update one or more bits in the vector by:

in response to the select signal having a first pre-defined value, setting all the bits in the right set to zero and leaving all the bits in the left set unchanged; and in response to the select signal has a second pre-defined value, setting all the bits in the left set to zero and leaving the bits in the right set unchanged.

14. The arbiter according to claim 12, further comprising:

an input configured to receive payload data from one or more of the plurality of ordered requestors; and payload selection logic comprising hardware logic arranged to select payload data, from the received payload data, to output to the shared resource using the one-hot vector.

15. The arbiter according to claim 14, further comprising an output configured to output the selected payload data.

16. The arbiter according to claim 14, wherein the payload selection logic comprises:

a plurality of AND logic elements, each AND logic element corresponding to one of the requestors, wherein each AND logic element is configured to combine the payload data from the requestor and a corresponding bit from the one-hot vector to generate updated payload data for the requestor; and an OR-reduction stage configured to combine the updated payload data for each of the requestors.

17. The arbiter according to claim 12, further comprising priority control logic arranged to generate priority data for a next processing cycle using the one-hot vector.

18. The arbiter according to claim 17, wherein the priority control logic comprises:

hardware logic arranged to:

generate a priority vector comprising one bit corresponding to each requestor and setting each bit in the vector to one;

based on the plurality of select signals corresponding to different decision nodes in the first layer of the binary decision tree in the requestor selection logic, update one or more bits in the priority vector;

for each subsequent layer in the binary decision tree and based on the one or more select signals corresponding to different decision nodes in the subsequent layer of the binary decision tree, update one or more bits in the priority vector; and prior to outputting the priority vector, invert the one-hot vector and update each bit in the priority vector by combining, in an AND logic element, each bit in the priority vector with a corresponding bit in the inverted one-hot vector, wherein for any decision node in the binary decision tree, there is a corresponding select signal and two corresponding sets of bits in the priority vector, a left set and a right set, the left set comprising bits corresponding to requestors connected to a left input node of the decision node and the right set comprising bits corresponding to requestors connected to a right input node of the decision node and wherein updating one or more bits in the priority vector comprises, for each select signal in the layer of the binary decision tree:

if the select signal has a value of one, setting all the bits in the right set to zero and leaving all the bits in the left set unchanged; and if the select signal has a value of zero, setting all the bits in the left set to one and leaving the bits in the right set unchanged.

19. The arbiter according to claim 17, wherein the priority control logic comprises:

hardware logic arranged to:

generate a priority vector comprising one bit corresponding to each requestor and setting each bit in the vector to one;

based on the plurality of select signals corresponding to different decision nodes in the first layer of the binary decision tree, update one or more bits in the priority vector; and for each subsequent layer in the binary decision tree and based on the one or more select signals corresponding to different decision nodes in the subsequent layer of the binary decision tree, update one or more bits in the priority vector; and prior to outputting the priority vector, update each bit in the priority vector by shifting it by one bit position to the left, wherein for any decision node in the binary decision tree, there is a corresponding select signal and two corresponding sets of bits in the priority vector, a left set and a right set, the left set comprising bits corresponding to requestors connected to a left input node of the decision node and the right set comprising bits corresponding to requestors connected to a right input node of the decision node and wherein updating one or more bits in the priority vector comprises, for each select signal in the layer of the binary decision tree:

if the select signal has a value of one, setting all the bits in the right set to zero and leaving all the bits in the left set unchanged; and if the select signal has a value of zero, setting all the bits in the left set to one and leaving the bits in the right set unchanged.

20. A non-transitory computer readable storage medium having stored thereon computer readable code configured to cause at least one processor to arbitrate between a plurality of ordered requestors and a shared resource in a computing system to be performed when the code is run, by:

generating a one-hot vector separately from, but in parallel with, a binary decision tree, the one-hot vector comprising a plurality of bits having a value of zero and a single bit having a value of one; and granting access to the shared resource to the requestor corresponding to the bit having a value of one, wherein access is granted for a current processing cycle, wherein generating a one-hot vector separately from, but in parallel with a decision tree, comprises:

generating a vector comprising one bit corresponding to each requestor and setting each bit in the vector to one;

based on a plurality of select signals, each select signal corresponding to a different decision node in a first layer of the binary decision tree implemented in hardware logic, setting bits in the vector corresponding to non-selected requestors to zero, wherein each select signal is configured to be used by the corresponding decision node in the binary decision tree to select one of two child nodes; and for each subsequent layer in the binary decision tree and based on one or more select signals corresponding to different decision nodes in the subsequent layer of the binary decision tree, setting bits in the vector corresponding to non-selected requestors to zero.

* * * * *